US012724926B1

(12) United States Patent
Paris, III

(10) Patent No.: US 12,724,926 B1
(45) **Date of Patent: *Sep. 1, 2026**

(54) ANALYSIS AND RIGHTS MANAGEMENT OF DISASSOCIATED SPLINTERED DATA

(71) Applicant: Vigilytics LLC, Victor, NY (US)

(72) Inventor: Andrew L. Paris, III, Victor, NY (US)

(73) Assignee: Vigilytics LLC, Victor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/350,561

(22) Filed: Oct. 6, 2025

Related U.S. Application Data

(63) Continuation of application No. 19/238,157, filed on Jun. 13, 2025, now Pat. No. 12,443,755.

(51) Int. Cl.
*G06F 21/62* (2013.01)
*H04L 9/08* (2006.01)

(52) U.S. Cl.
CPC ........ *G06F 21/6254* (2013.01); *H04L 9/0819* (2013.01)

(58) Field of Classification Search
CPC ........................... G06F 21/6254; H04L 9/0819
See application file for complete search history.

(56) References Cited

U.S. PATENT DOCUMENTS 5,596,748 A * 1/1997 Kleewein .............. G06F 16/256
5,758,337 A * 5/1998 Hammond .......... G06F 16/2365
8,578,176 B2 11/2013 Mattsson
9,118,641 B1 8/2015 Paris, III
9,323,892 B1 4/2016 Paris, III
10,886,012 B1 1/2021 Paris, III
11,004,548 B1 5/2021 Austin et al.
11,863,597 B1 1/2024 Gosztyla et al.
12,120,237 B1 10/2024 Paris, III
2003/0009523 A1 1/2003 Lindskog et al.
2004/0078336 A1 4/2004 Asadu
(Continued)

FOREIGN PATENT DOCUMENTS

CN 116865993 A 10/2023
EP 4432712 A1 9/2024
(Continued)

OTHER PUBLICATIONS

Al-Qudah et al., "Internet With Transient Destination-Controlled Addressing," IEEE/ACM Transactions on Networking, Apr. 2016, 24(2):731-744.

(Continued)

*Primary Examiner* — Meng Li
(74) *Attorney, Agent, or Firm* — Fish & Richardson P.C.

(57) ABSTRACT

A system that includes a redacted records data server for storing a redacted data record that includes a redacted primary key and a sensitive linking key, a sensitive records data server for storing a sensitive data record that includes a sensitive primary key and a redacted linking key. The system includes a key converter server operable to convert the redacted linking key into the redacted primary key and the sensitive linking key into the sensitive primary key, and a records request server configured to receive authorization to combine the redacted data record with the sensitive data record, and upon receiving authorization, to generate a combined data record and transmit the combined data record to a user device.

28 Claims, 16 Drawing Sheets

(56) References Cited

U.S. PATENT DOCUMENTS

2005/0283620 A1* 12/2005 Khulusi .............. H04L 63/0421 713/185
2008/0147554 A1* 6/2008 Stevens .................. G16H 10/60 705/51
2009/0249082 A1 10/2009 Mattsson
2012/0072992 A1* 3/2012 Arasaratnam ......... G06F 21/602 726/26
2012/0173563 A1 7/2012 Griffin et al.
2012/0266231 A1 10/2012 Spiers et al.
2014/0047551 A1* 2/2014 Nagasundaram ..... G06F 16/285 726/26
2014/0146954 A1 5/2014 Noldus et al.
2014/0283089 A1 9/2014 Arya et al.
2014/0359709 A1 12/2014 Nassar et al.
2014/0372544 A1 12/2014 Wen
2015/0135327 A1 5/2015 Wall et al.
2016/0165306 A1 6/2016 Nam
2016/0182231 A1 6/2016 Fontecchio
2017/0132431 A1 5/2017 Gonzalez Blanco et al.
2017/0372096 A1 12/2017 Yousfi et al.
2018/0082082 A1 3/2018 Lowenberg et al.
2018/0189502 A1 7/2018 Kumar et al.
2020/0076578 A1 3/2020 Ithal et al.
2020/0125751 A1* 4/2020 Hariharasubrahmanian ................ H04L 9/3247
2020/0143082 A1 5/2020 Dubishar et al.
2020/0265155 A1* 8/2020 Dong .................. G06F 21/6218
2020/0273079 A1 8/2020 Raviv et al.
2020/0286015 A1 9/2020 Richards et al.
2020/0329015 A1 10/2020 Itzkovich et al.
2021/0149862 A1 5/2021 Bernard et al.
2021/0155221 A1* 5/2021 Gottehrer ........... G01C 21/3605
2021/0182428 A1 6/2021 Paris, III
2022/0076334 A1 3/2022 Filter et al.
2022/0083899 A1* 3/2022 Bhide .................... G06N 20/00
2022/0147503 A1* 5/2022 Punna ................. G06F 16/2255
2022/0156177 A1 5/2022 Levacher et al.
2022/0188457 A1 6/2022 Babu et al.
2022/0269820 A1* 8/2022 Singh Bawa ......... G06F 18/214
2023/0088867 A1* 3/2023 Jacobson ............ G06F 21/6254 726/26
2023/0134781 A1 5/2023 Senerth et al.
2023/0208837 A1 6/2023 Tulshibagwale et al.
2023/0216679 A1 7/2023 Tomar
2023/0237195 A1* 7/2023 Noon .................... H04W 12/02 726/4
2023/0239324 A1 7/2023 Shetty et al.
2023/0260614 A1 8/2023 Kromelow et al.
2024/0303370 A1* 9/2024 Gehrmann ............. G06V 10/42
2025/0202683 A1 6/2025 Jones et al.
2025/0355842 A1* 11/2025 Agarwal ........... G06F 16/24544

FOREIGN PATENT DOCUMENTS

JP 2008-312172 A 12/2008
WO WO 2017/161403 A1 9/2017
WO WO 2023/043807 A1 3/2023
WO WO 2023/135327 A1 5/2023

OTHER PUBLICATIONS eur-lex.europa.eu [online], “Regulation (EU) 2016/679 of the European Parliament and of the Council of Apr. 27, 2016 (on the protection of natural persons with regard to the processing of personal data and on the free movement of such data, and repealing Directive 95/46/EC (General Data Protection Regulation)),” Apr. 27, 2016, retrieved on May 10, 2024, retrieved from URL<https://eur-lex.europa.eu/legal-content/EN/TXT/PDF/?uri=CELEX:32016R0679>, 88 pages.
Extended European Search Report in European Appln. No. 25167407.3, mailed on Jun. 3, 2025, 12 pages.
gdpr-info.eu/ [online], “General Data Protection Regulation GDPR,” May 25, 2018, retrieved on May 10, 2024, retrieved from URL<https://gdpr-info.eu/>, 7 pages.
International Search Report and Written Opinion in International Appln. No. PCT/US2025/021901, mailed on Apr. 23, 2025, 8 pages.
International Search Report and Written Opinion in International Appln. No. PCT/US2025/022155, mailed on Jun. 18, 2025, 8 pages.

* cited by examiner

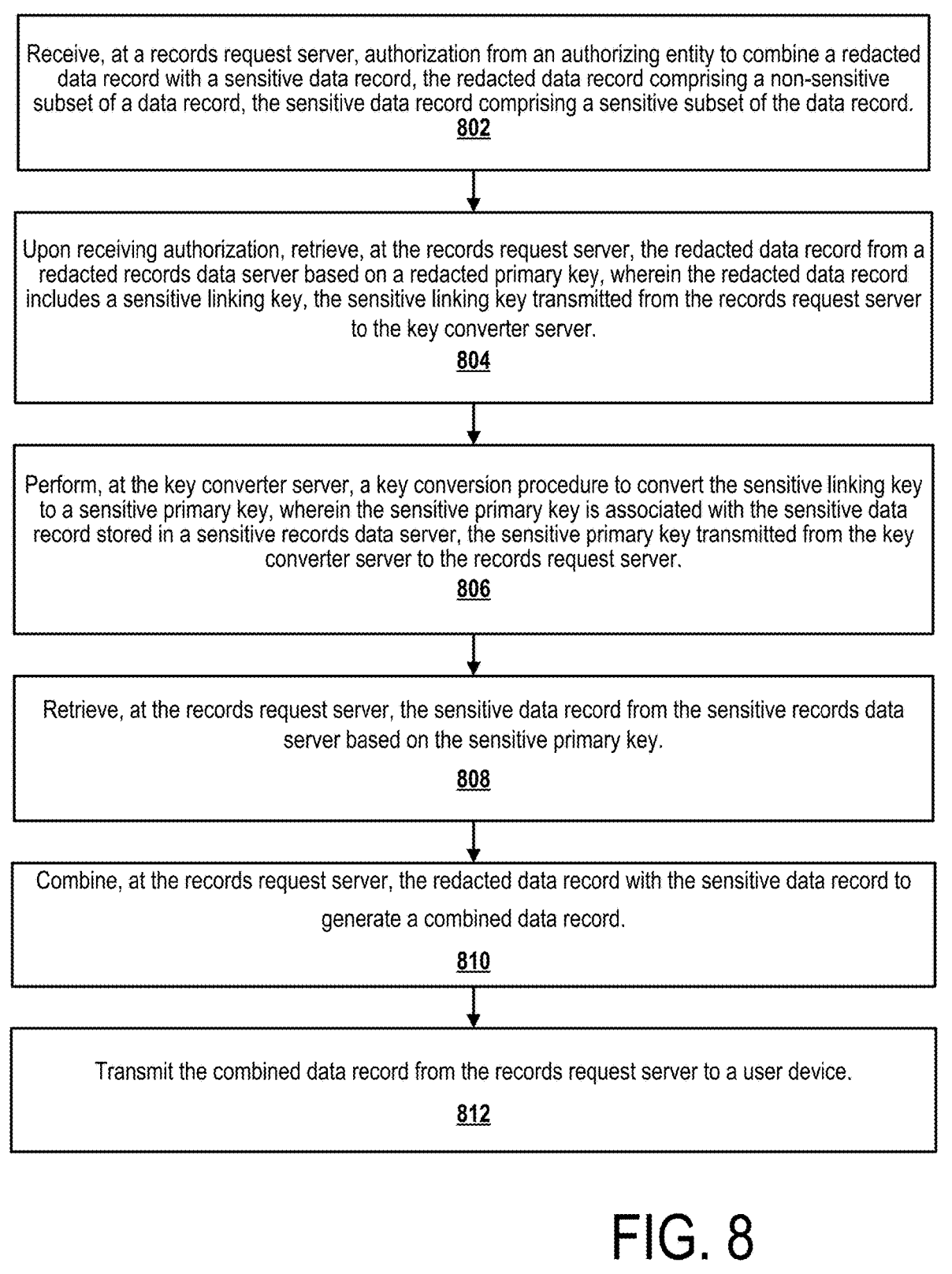

Receive, at a records request server, authorization from an authorizing entity to combine a redacted data record with a sensitive data record, the redacted data record comprising a non-sensitive subset of a data record, the sensitive data record comprising a sensitive subset of the data record.
802

Upon receiving authorization, retrieve, at the records request server, the redacted data record from a redacted records data server based on a redacted primary key, wherein the redacted data record includes a sensitive linking key, the sensitive linking key transmitted from the records request server to the key converter server.
804

Perform, at the key converter server, a key conversion procedure to convert the sensitive linking key to a sensitive primary key, wherein the sensitive primary key is associated with the sensitive data record stored in a sensitive records data server, the sensitive primary key transmitted from the key converter server to the records request server.
806

Retrieve, at the records request server, the sensitive data record from the sensitive records data server based on the sensitive primary key.
808

Combine, at the records request server, the redacted data record with the sensitive data record to generate a combined data record.
810

Transmit the combined data record from the records request server to a user device.
812

FIG. 8

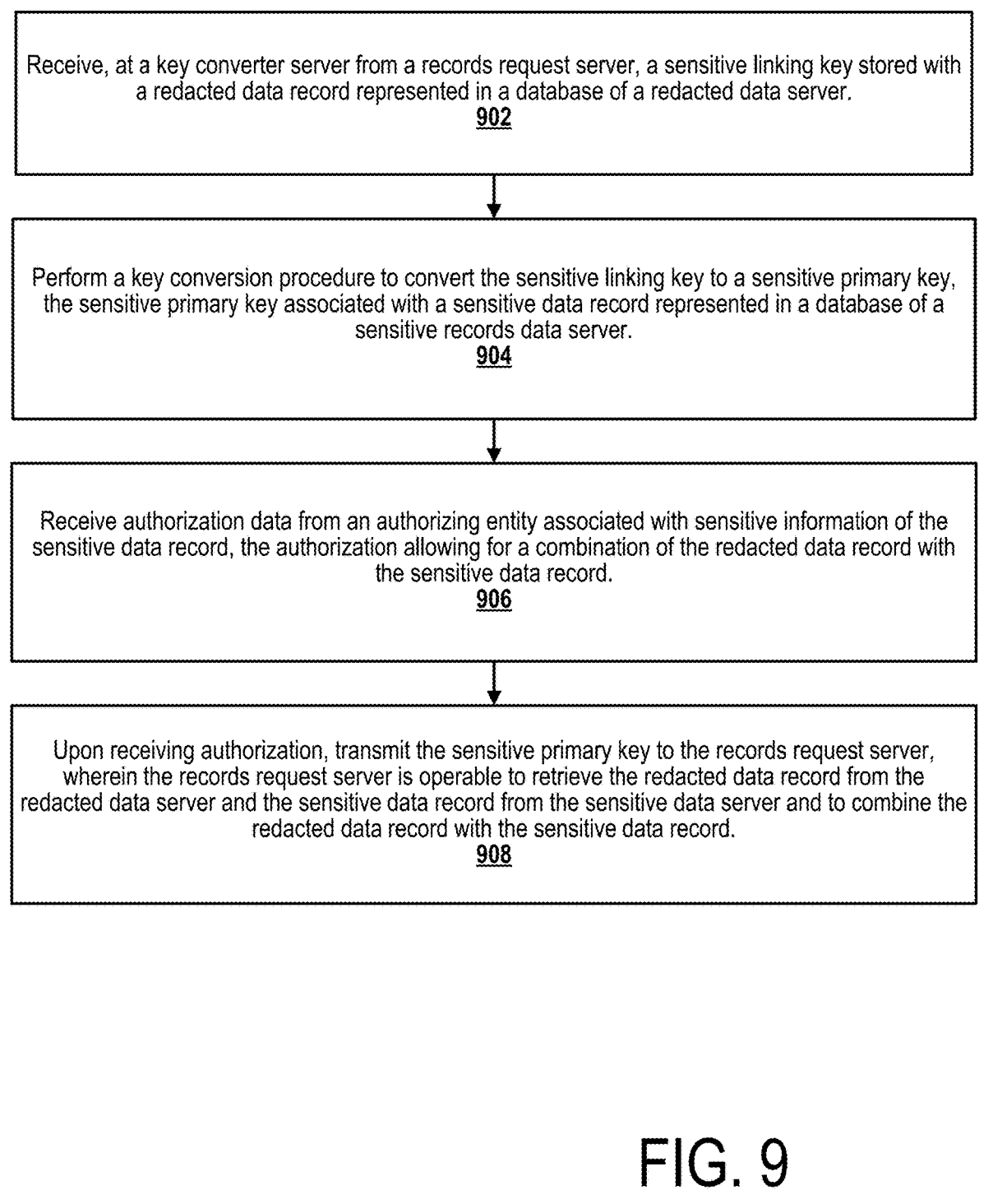

Receive, at a key converter server from a records request server, a sensitive linking key stored with a redacted data record represented in a database of a redacted data server.
902

↓

Perform a key conversion procedure to convert the sensitive linking key to a sensitive primary key, the sensitive primary key associated with a sensitive data record represented in a database of a sensitive records data server.
904

↓

Receive authorization data from an authorizing entity associated with sensitive information of the sensitive data record, the authorization allowing for a combination of the redacted data record with the sensitive data record.
906

↓

Upon receiving authorization, transmit the sensitive primary key to the records request server, wherein the records request server is operable to retrieve the redacted data record from the redacted data server and the sensitive data record from the sensitive data server and to combine the redacted data record with the sensitive data record.
908

FIG. 9

Receive a data record comprising sensitive information.
1002

Generate a redacted data record from the data record, wherein the redacted data record comprises the data record without the sensitive information.
1004

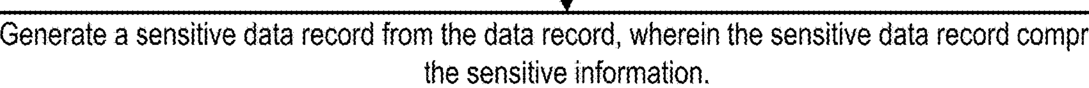

Generate a sensitive data record from the data record, wherein the sensitive data record comprises the sensitive information.
1006

Generate a sensitive linking key to be stored with the redacted data record in a redacted records data server.
1008

Generate a sensitive primary key to be stored with the sensitive data record in a sensitive records data server, wherein the sensitive primary key is generated by processing the sensitive linking key with a first key conversion procedure.
1010

Generate a redacted linking key to be stored with the sensitive data record in the sensitive records data server.
1012

Generate a redacted primary key to be stored with the redacted data record in the redacted records data server, wherein the redacted primary key is generated by processing the redacted linking key with a second key conversion procedure.
1014

Store the redacted data record, the redacted primary key, and the sensitive linking key in the redacted records data server.
1016

Store the sensitive data record, the sensitive primary key, and the redacted linking key in the sensitive records data server.
1018

FIG. 10

ANALYSIS AND RIGHTS MANAGEMENT OF DISASSOCIATED SPLINTERED DATA

CROSS REFERENCE TO RELATED APPLICATION

This application is a continuation (and claims the benefit of priority under 35 USC 120) of U.S. application Ser. No. 19/238,157, filed Jun. 13, 2025, the content of which is incorporated herein in its entirety by reference.

BACKGROUND

In the era of large scale processing of digital information, individuals and organizations increasingly rely on electronic systems to store and manage sensitive information, such as personal data, financial records, and confidential business documents. As the volume and value of this data grow, so do the risks associated with unauthorized access, data breaches, and misuse.

Traditional methods of securing sensitive information often involve encryption, password protection, or centralized access controls. However, these approaches can be vulnerable to cyberattacks, insider threats, or system failures. The importance of safeguarding this data against unauthorized access and misuse is critical, especially in light of increasing concerns about privacy and data security.

SUMMARY

The systems and techniques described here relate to storing, accessing, and managing access rights of personal and/or sensitive information associated with an individual or an authorizing entity. Data security regulations, including the General Data Protection Regulation (GDPR), require strict data security and access management protocols to be followed by entities that collect, manage, and analyze personal information. In addition to regulations related to data collection (e.g., transparency of how data is used, collecting data for a specific purpose, and only collecting a minimum amount of necessary personal information), some data security regulations include requirements related to storage of the personal information. For example, in some cases, personal information should only be retained for as long as necessary for the purposes for which it was collected. As another example, in some cases, personal information must be handled in a way that ensures security, including protection against unauthorized or unlawful processing. Furthermore, in some cases, entities that collect information are responsible for complying with data security regulations while being able to demonstrate the compliance through documentation, policies, audits, etc.

To address data security requirements related to securely storing personal information, the present disclosure relates to systems and methods for securely storing data records that contain sensitive information (e.g., personal information), accessing the stored data records, and managing rights for particular individuals to access the data records. In particular, the described methods include a disassociation and splintering of sensitive data and non-sensitive data that are contained within each data record.

The sensitive and non-sensitive data are disassociated by generating, for each data record, a sensitive data record and a redacted data record. The sensitive data record is a subset of the data record that includes sensitive information. The redacted data record is a subset of the data record that does not include the sensitive information. A combination of the sensitive data record with the redacted data record results in the original data record. The sensitive data record and redacted data record are splintered by storing the records in distinct data storage environments (e.g., physically independent data servers, virtually segmented database environments, separate tables within a database, among other possible architectures). For an unauthorized entity to access a particular data record, an associated authorizing entity provides authorization for the unauthorized entity to receive the particular data record that includes sensitive information related to or managed by the authorizing entity.

The subject matter described in this specification can be implemented in particular embodiments to realize one or more of the following advantages. Techniques are described for disassociating and splintering data records that contain sensitive information and managing access rights related to the data records. In particular, the techniques relate to securely storing sensitive information in a data storage environment such that if accessed in an unauthorized manner, the sensitive information cannot be linked to a redacted data record counterpart stored in an independent data storage environment without access to a further independent data processing server.

The data processing server (e.g., a key converter server) converts a key associated with the sensitive information to a key associated with the redacted data record counterpart "on the fly". In other words, linking information between the two data environments is not stored directly in any data table. This is in contrast to traditional relational databases in which a secondary key (or a foreign key) of a first data table points to a primary key of a second data table, such that access to the first data table provides a mapping to associated data stored in the second data table. The present techniques enable a data environment such that access to the first data table provides no direct information to a storage location of associated data stored in the second data table.

In an aspect, a system includes a redacted records data server for storing a redacted data record including a non-sensitive subset of a data record, in which the redacted data record includes a redacted primary key and a sensitive linking key. The system includes a sensitive records data server for storing a sensitive data record including a sensitive subset of the data record, in which the sensitive data record includes a sensitive primary key and a redacted linking key. The system includes a key converter server operable to (i) convert the redacted linking key to the redacted primary key by implementing a first key conversion procedure and (ii) convert the sensitive linking key to the sensitive primary key by implementing a second key conversion procedure. Furthermore, the system includes a records request server configured to perform operations including receiving authorization from an authorizing entity to combine the redacted data record with the sensitive data record. Upon receiving authorization, the operations include retrieving the redacted data record from the redacted records data server based on the redacted primary key, receiving the sensitive primary key based on an execution of the second key conversion procedure on the sensitive linking key at the key converter server, retrieving the sensitive data record from the sensitive records data server based on the sensitive primary key received from the key converter server, combining the redacted data record with the sensitive data record to generate a combined data record, and transmitting the combined data record to a user device.

In some implementations, the redacted primary key is generated independent from data values of the redacted data record. In some implementations, the redacted primary key is a random number.

In some implementations, the first key conversion procedure and the second key conversion procedure comprise a respective one-way cipher.

In some implementations, the records request server is configured to perform operations including receiving a user query from a user device, retrieving candidate redacted data records associated with the user query from the redacted records data server, and transmitting the candidate redacted records to the user device. The user device is operable to transmit selected redacted records to the records request server, in which the selected redacted records are a subset of the candidate redacted records, and the selected redacted records include the redacted data record.

In some implementations, the records request server transmits the candidate redacted records to the user device without associated redacted primary keys and associated sensitive linking keys. The records request server stores the associated redacted primary keys and associated sensitive linking keys in a storage device.

In some implementations, the records request server is configured to perform operations that include encrypting authorization data associated with the received authorization and storing the encrypted authorization data in a storage device.

In some implementations, the sensitive records data server stores the sensitive data record in multiple data tables implemented on multiple data servers, each data table storing a portion of the sensitive data record. In some implementations, each portion of the sensitive data record is associated with a respective sensitive primary key and a respective sensitive linking key, each sensitive linking key generated by processing the sensitive primary key and a respective salt value with the second key conversion procedure.

In some implementations, the redacted data server is operable to implement a redacted database that is characterized by a redacted database schema with data fields including the redacted primary key, the sensitive linking key, and at least one redacted data field associated with the non-sensitive subset of the data record. In some implementations, the sensitive data server is operable to implement a sensitive database that is characterized by a sensitive database schema with data fields including the sensitive primary key, the redacted linking key, and at least one sensitive data field associated with the sensitive subset of the data record.

In some implementations, operations executed by the key converter server and operations executed by the records request server are executed on one or more computing devices of a shared security environment.

In some implementations, the records request server is configured to perform operations that include retrieving an intermediate linking key from an intermediate data server based on the sensitive linking key, the intermediate data server implementing a data table storing a mapping of the intermediate linking key and the sensitive linking key. The records request server is further configured to transmit the intermediate linking key to the key converter server, the key converter server operable to convert the intermediate linking key to the sensitive primary key.

In some implementations, the records request server is configured to perform operations that include retrieving an intermediate linking key from an intermediate key converter server configured to convert the sensitive linking key to the intermediate linking key by executing an intermediate key conversion procedure. The records request server is further configured to transmit the intermediate linking key to the key converter server, the key converter server operable to convert the intermediate linking key to the sensitive primary key.

In an aspect, a method that includes receiving, at records request server, authorization from an authorizing entity to combine a redacted data record with a sensitive data record, the redacted data record including a non-sensitive subset of a data record, the sensitive data record including a sensitive subset of the data record. Upon receiving authorization, the method includes retrieving, at the records request server, the redacted data record from a redacted records data server based on a redacted primary key, in which the redacted data record includes a sensitive linking key, the sensitive linking key transmitted from the records request server to a key converter server. The method includes performing, at the key converter server, a key conversion procedure to convert the sensitive linking key to a sensitive primary key, in which the sensitive primary key is associated with the sensitive data record stored in a sensitive records data server, the sensitive primary key transmitted from the key converter server to the records request server. The method includes retrieving, at the records request server, the sensitive data record from the sensitive records data server based on the sensitive primary key. The method includes combining, at the records request server, the redacted data record with the sensitive data record to generate a combined data record and transmitting the combined data record from the records request server to a user device.

In some implementations, the redacted primary key is generated independent from data values of the redacted data record. In some implementations, the redacted primary key is a random number. In some implementations, the key conversion procedure comprises a one-way cipher.

In some implementations, the method includes receiving, at the records request server, a user query from the user device, retrieving, at the records request server, candidate redacted data records associated with the user query from the redacted records data server, and transmitting, from the records request server to the user device, the candidate redacted records, the user device operable to transmit selected redacted records to the records request server, the selected redacted records a subset of the candidate redacted records, and the selected redacted records including the redacted data record.

In some implementations, upon retrieving the candidate redacted records from the redacted records data server, the records request server stores associated redacted primary keys and associated sensitive linking keys in a storage device.

In some implementations, the method includes encrypting authorization data associated with the received authorization from the authorizing entity and storing the encrypted authorization data in a storage device.

In some implementations, the sensitive records data server stores the sensitive data record in multiple data tables implemented on multiple data servers, each data table storing a portion of the sensitive data record. In some implementations, each portion of the sensitive data record is associated with a respective sensitive primary key and a respective sensitive linking key, each sensitive linking key generated by processing the sensitive primary kay and a respective salt value with the key conversion procedure.

In some implementations, the redacted data server is operable to implement a redacted database that is characterized by a redacted database schema with data fields including the redacted primary key, the sensitive linking key, and at least one redacted data field associated with the non-sensitive subset of the data record. In some implementations, the sensitive data server is operable to implement a sensitive database that is characterized by a sensitive database schema with data fields including the sensitive primary key, a redacted linking key, and at least one sensitive data field associated with the sensitive subset of the data record.

In some implementations, operations executed by the key converter server and the operations executed by the records request server are executed on one or more computing devices of a shared security environment.

In some implementations, the method includes receiving, at the records request server, an intermediate linking key from an intermediate data server based on the sensitive linking key, the intermediate data server implementing a data table storing a mapping of the intermediate linking key and the sensitive linking key. The method further includes transmitting, from the records request server to the key converter server, the intermediate linking key, the key converter server operable to convert the intermediate linking key to the sensitive primary key.

In some implementations, the method includes retrieving, at the records request server, an intermediate linking key from an intermediate key converter server configured to convert the sensitive linking key to the intermediate linking key by executing an intermediate key conversion procedure and transmitting the intermediate linking key to the key converter server, the key converter server operable to convert the intermediate linking key to the sensitive primary key.

In an aspect, one or more non-transitory computer readable media storing instructions that, when executed by at least one processor, cause the at least one processor to perform operations that include receiving, at records request server, authorization from an authorizing entity to combine a redacted data record with a sensitive data record, the redacted data record including a non-sensitive subset of a data record, the sensitive data record including a sensitive subset of the data record. Upon receiving authorization, the method includes retrieving, at the records request server, the redacted data record from a redacted records data server based on a redacted primary key, in which the redacted data record includes a sensitive linking key, the sensitive linking key transmitted from the records request server to a key converter server. The method includes performing, at the key converter server, a key conversion procedure to convert the sensitive linking key to a sensitive primary key, in which the sensitive primary key is associated with the sensitive data record stored in a sensitive records data server, the sensitive primary key transmitted from the key converter server to the records request server. The method includes retrieving, at the records request server, the sensitive data record from the sensitive records data server based on the sensitive primary key. The method includes combining, at the records request server, the redacted data record with the sensitive data record to generate a combined data record and transmitting the combined data record from the records request server to a user device.

In some implementations, the operations includes receiving, at the records request server, a user query from the user device, retrieving, at the records request server, candidate redacted data records associated with the user query from the redacted records data server, and transmitting, from the records request server to the user device, the candidate redacted records, the user device operable to transmit selected redacted records to the records request server, the selected redacted records a subset of the candidate redacted records, and the selected redacted records including the redacted data record.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 8 is a flow diagram of a process for combining redacted data with associated sensitive data.

FIG. 9 is a flow diagram of a process for converting a linking key stored in a first database to a primary key stored in a second database.

FIG. 10 is a flow diagram of a process for disassociating and splintering a data record.

Like reference numbers and designations in the various drawings indicate like elements.

DETAILED DESCRIPTION

The General Data Protection Regulation (GDPR) serves as a cornerstone in a legal framework that governs data protection in the European Union. It imposes strict requirements on data controllers and processors, emphasizing the principles of data minimization, purpose limitation, and a necessity of ensuring data accuracy and security. A critical aspect of GDPR is an emphasis on de-identification of sensitive information, which involves processing data to remove or obscure personal identifiers so that a subject of the data can no longer be directly or indirectly identified.

Under GDPR, sensitive information (e.g., personal data) must be processed and stored in a way that ensures privacy and security. One example mechanism for complying with the security requirements of GDPR is through data disassociation, which involves removing and/or altering personal identifiers (e.g., name, address, email, among others) from stored data such that individuals can no longer be directly or indirectly identified. To comply with GDPR, the process of disassociation must be irreversible (e.g., the disassociated personal information cannot be re-linked to an individual or to a data set from which it is disassociated). The systems and methods described in the present disclosure relate to methods of disassociating sensitive information such that data stored in compromised data servers cannot be linked to associated individuals or entities.

Throughout the present disclosure, "disassociated data" refers to an input dataset that is split into a "redacted dataset" and a "sensitive dataset." A combination of the disassociated data (e.g., the redacted dataset with the sensitive dataset) yields the input dataset. Furthermore, throughout the present disclosure, "splintered data" refers to an input dataset that has been split into two or more data subsets, with the data subsets stored in independent data environments, e.g., stored in distinct data servers, distinct databases with independent security protocols, or by other means of separating the two or more data subsets to be stored in independent data environments.

Figure 1:
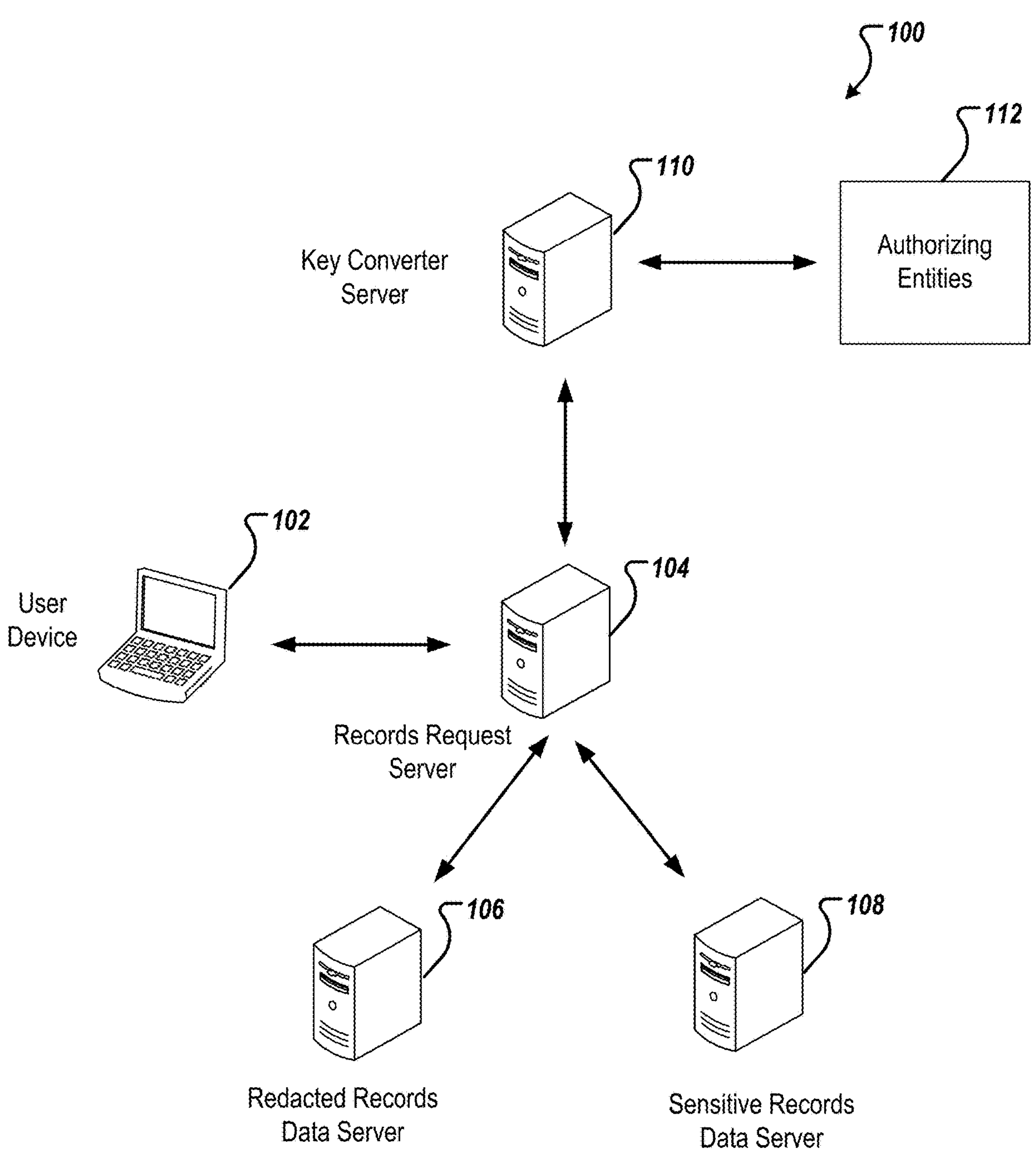
FIG. 1 illustrates an environment that graphically represents an architecture for storing and accessing disassociated splintered data.

FIG. 1 illustrates an environment 100 that graphically represents an architecture for storing and accessing disassociated splintered data (e.g., data that is split into a redacted dataset and a sensitive dataset and stored in independent data storage environments). The environment 100 includes a user device 102 that is communicatively coupled with a records request server 104. The records request server 104 is communicatively coupled with a redacted records data server 106 configured to store redacted datasets and a sensitive records data server 108 configured to store sensitive datasets. The records request server 104 is also communicatively coupled with a key converter server 110.

Figure 2A:
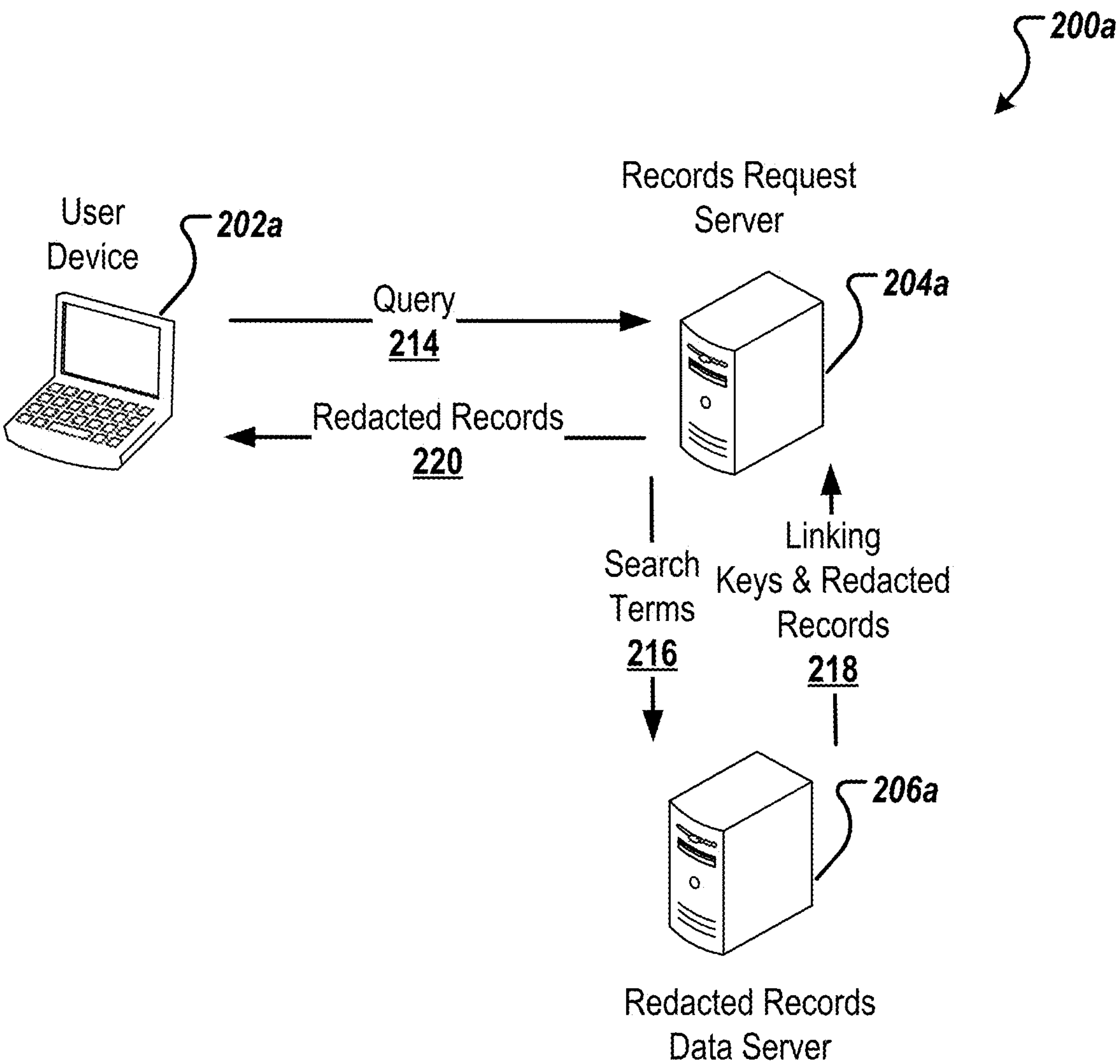
FIG. 2A illustrates an environment that graphically represents circumstances in which redacted records are retrieved from a redacted records data server based on a user query.
Figure 2B:
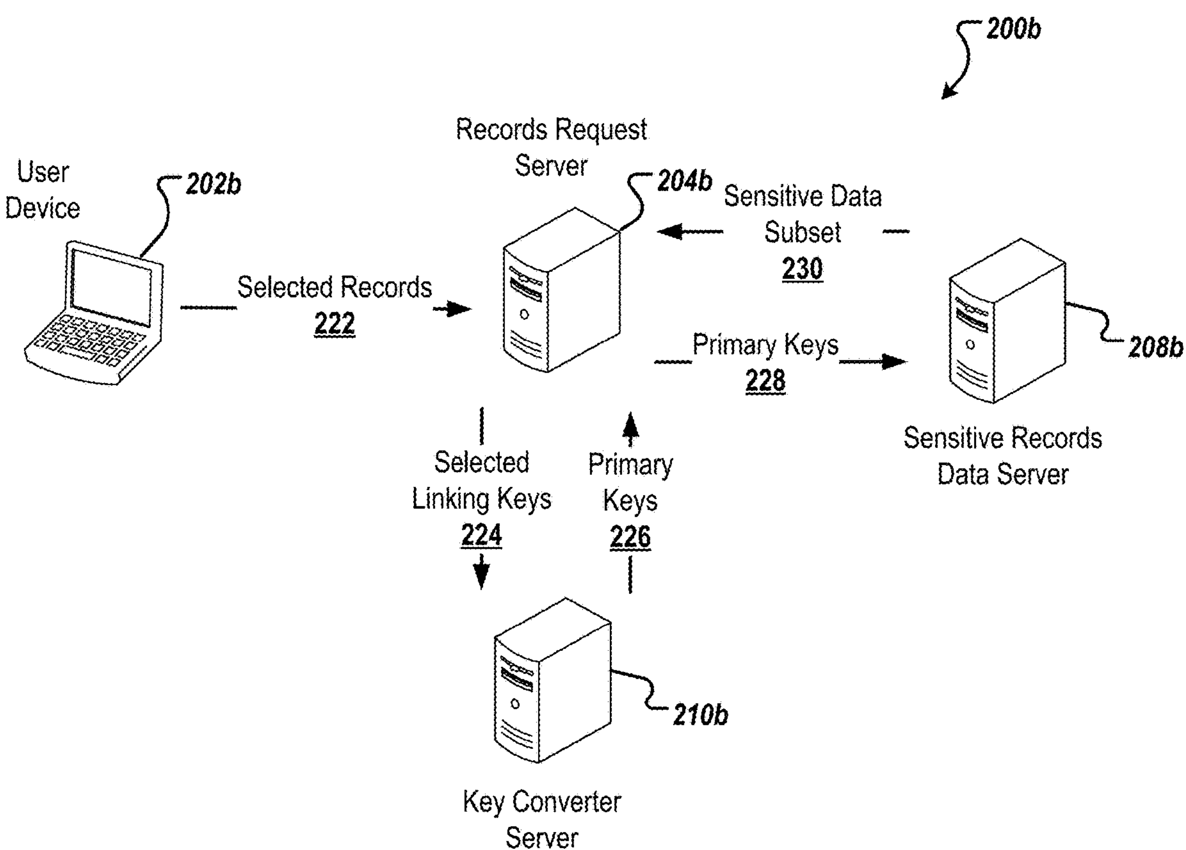
FIG. 2B illustrates an environment that graphically represents circumstances in which a records request server receives a set of selected records from a user.
Figure 2C:
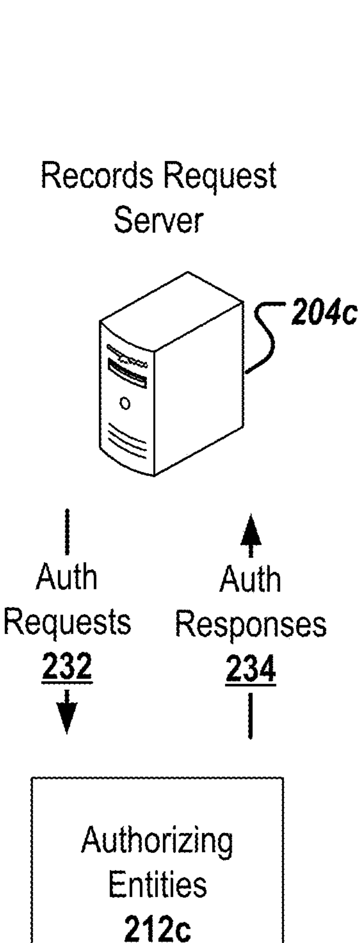
FIG. 2C illustrates an environment that graphically represents circumstances in which a records request server transmits a set of authorization requests to one or more authorizing entities and receives one or more associated authorization responses from the one or more authorizing entities.
Figure 2D:
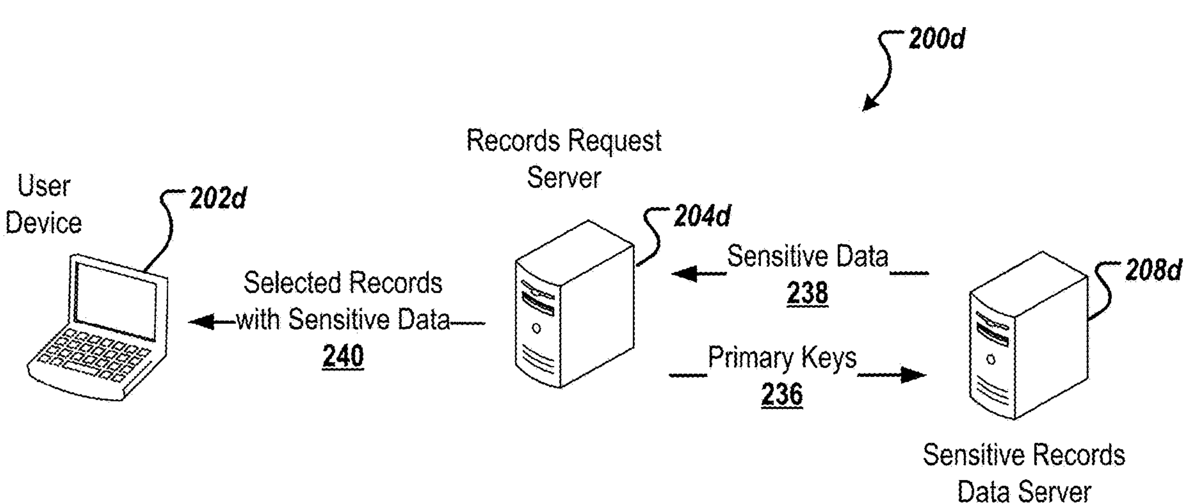
FIG. 2D illustrates an environment that graphically represents circumstances in which a records request server receives sensitive data from a sensitive records data server and combines the sensitive data with an associated set of selected records to be returned to a user.
Figure 2E:
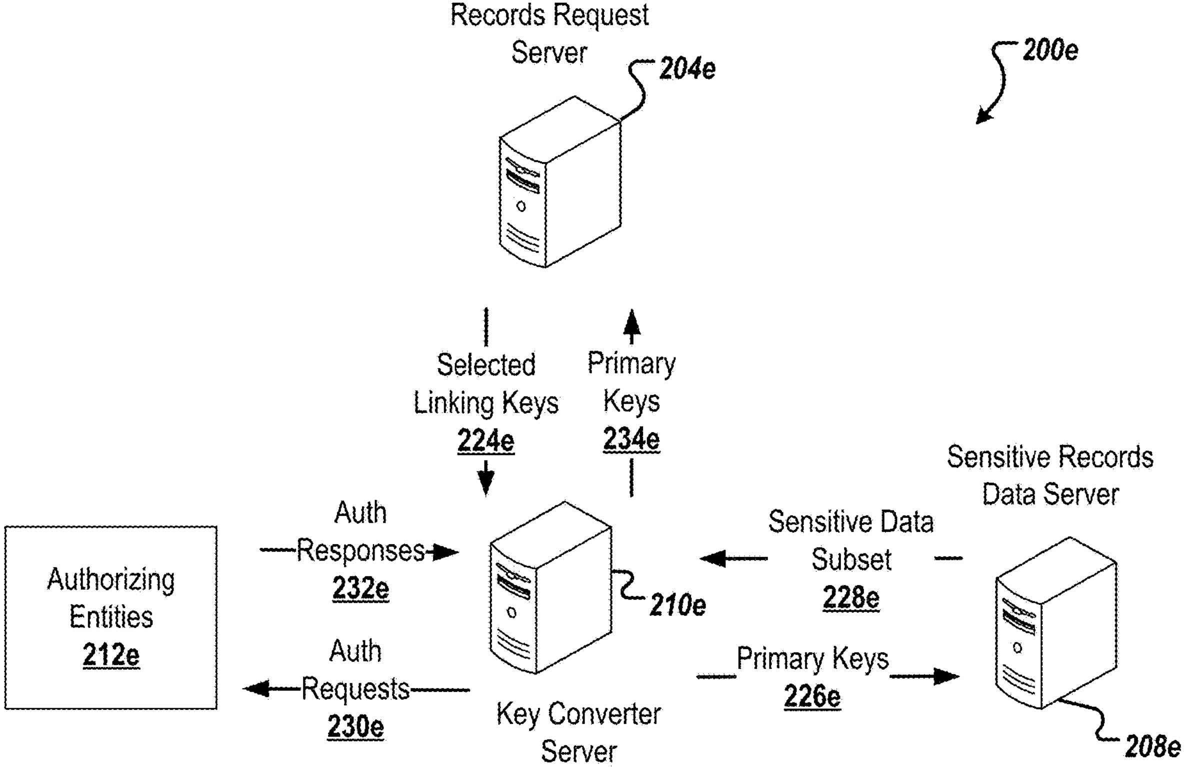
FIG. 2E illustrates an environment that graphically represents circumstances in which a key converter server interacts with an authorization entity.

In some implementations, the key converter server 110 is operable to communicate with one or more authorizing entities 112 over one or more communication channels, as described in relation to FIG. 2E. In some other implementations, not depicted in FIG. 1, the records request server 104 is operable to communicate with the one or more authorizing entities 112, as described in relation to FIG. 2C.

In some cases, the authorizing entities 112 include individuals or representatives associated with data stored in the sensitive records data server 108. In some cases, the one or more communication channels include email, telephone, text message, among others. In some implementations, one or more servers described as components of the architecture depicted in the environment 100 are implemented on a single server or device with appropriate security and/or access control delineations within the single server or device.

In some implementations, the records request server 104 receives a user query from the user device 102. In some cases, the user query includes text indicative of a search term. In these cases, the records request server 104 converts the user query into a search query to be processed by the redacted records data server 106. In some other cases, the user query includes text indicative of a particular set of identifying information (e.g., a person's name, email address, etc.). In these other cases, the records request server 104 converts the user query into a search query to be processed by the sensitive records data server 108. In some implementations, the redacted records data server 106 and the sensitive records data server 108 include a respective implementation of a structured database, unstructured database, raw text files, encrypted data, among other stored and searchable formats of text and non-text data.

In some implementations, the user device 102 is communicatively coupled directly to the redacted records data server 106 and/or the sensitive records data server 108, eliminating a need for the records request server 104. In these implementations, the respective conversions of the user query into respective search queries to be processed by the redacted records data server 106 and the sensitive records data server 108 are performed by the servers 106, 108 and/or by the user device 102.

In some implementations, the key converter server 110 receives requests from the records request server 104 to convert a key associated with a first database (e.g., a database implemented on the redacted records data server 106) to a key associated with a second database (e.g., a database implemented on the sensitive records data server 108). The key converter server 110 performs the conversion by processing the first key with one or more data processing procedures described in detail in relation to subsequent Figures. The various servers and systems that are described as components of the architecture depicted in the environment 100 interact according to a variety of procedures that govern how data flows between components, as described below.

Operations performed by the key converter server 110 and operations performed by the records request server 104 can be implemented on a single server. Similarly, the operations of each server can be implemented on distinct servers managed by a common trusted entity, such that a mapping between the first key to a second key is not able to be reverse-engineered by an entity associated with a server not managed by the common trusted entity. For illustrative purposes, the records request server 104 and the key converter server 110 are represented as independent servers; however, the key converter server 110 can be configured to communicate with the user device 102, the authorizing entities 112, and various data servers of the architecture of environment 100.

FIG. 2A illustrates an environment 200*a* that graphically represents circumstances of a first portion of a first data flow protocol. The first data flow protocol includes a series of data flow steps, in which an order of the data flow steps is indicated by increasing numerical identifiers, as illustrated in FIGS. 2A, B, C, D.

The first data flow protocol beings with a query 214 being transmitted from a user device 202*a* to a records request server 204*a*. The first data flow protocol ends (as described in relation to FIG. 2D) with the user device 202*a* receiving a set of selected data records that include associated sensitive data from the records request server 204*a*. FIGS. 2A, B, C, D depict steps of the first data flow protocol that allows an unauthorized entity (e.g., a user of the user device 202*a*) to access the set of selected data records with sensitive information, in which data represented in the set of selected data records are stored securely as disassociated splintered data in a system similar to the architecture described in relation to FIG. 1.

The first data flow protocol relates to enabling an unauthorized entity to access data records related to the query 214, in which the data records include sensitive information. Examples of the query 214 include "engineers with photonics experience," "mortgage contracts executed last year," "primary care visit summaries related to drug X," and "account statements with overdrawn balances." In some cases, the example queries are directed towards a system that stores data records related to the example queries, in which the data records include personal and/or sensitive information (name, identification numbers, account numbers, etc.).

In some implementations, a user interacts with a web interface of the user device 202*a* to provide the query 214 to the records request server 204*a* via a communication channel (e.g., an application programming interface (API)).

The records request server 204*a* converts the query 214 into search terms 216 that are transmitted to a redacted records data server 206*a*. In some cases, the search terms 216 include only the received query 214. In some implementations, the search terms 216 include the query 214 and/or additional synonyms and/or expansions of the query 214. In some implementations, the records request server 204*a* generates a database-specific database query based on the query 214 and the search terms 216 (e.g., a SQL query, NoSQL query, key-value, etc.). For example, in the case of a SQL database implemented on the redacted records data server 206*a*, the search terms 216 can be represented as "SELECT * FROM 'documents_table' WHERE 'data field' LIKE '% query %';", where '% query %' represents the query 214.

The redacted records data server 206*a* stores data records that do not include sensitive information (e.g., a redacted portion of disassociated data). For example, in some cases, sensitive information can include email addresses, identification numbers, and other personally identifiable information (PII). In some other cases, sensitive information can include information regarding a particular sensitive event, plan, or financial object. As an example, the records stored in the redacted records data server 206*a* can include resume data associated with multiple individuals with PII removed from the resumes (e.g., name, email address, address, etc.). The redacted resume data allows a user associated with the user device 202*a* to review particular features of the redacted records (e.g., experience, skills, etc.) without accessing an identity of each associated individual. In some implementations, the sensitive information is replaced with a sequence of tokens or other unrelated placeholders.

The redacted records data server 206*a* is operable to receive the search terms 216 (e.g., a set of terms or a database query) from the records request server 204*a*. In some implementations, the redacted records data server 206*a* generates a database query based on the received search terms 216 specific to a particular database implemented on the redacted records data server 206*a*.

The present disclosure is related to systems that include databases that store data records, in which each data record is associated with one or more keys (e.g., indices). For example, each record (e.g., row) of a SQL database table is associated with a primary key, and optionally one or more secondary keys that relate each record to one or more other records represented in other tables of the SQL database or other tables of different SQL databases.

The redacted records data server 206*a* includes a database with at least one data table, in which each row of the data table includes at least a primary key and a linking key. Referring to common implementations of a relational databases, the linking key provides similar functionality to a secondary key (index) or a foreign key (index), in which it provides a mapping to related data in another database or table. However, the linking keys described in the present disclosure do not directly link to related data. The linking requires an intermediate key conversion to identify a location of the related data, as described in relation to the following Figure. In some implementations, the linking key is generated randomly and is unique for each row of the data table. In some other implementations, the linking key is generated non-randomly (e.g., sequentially) and independent of other data fields stored in the respective row. In some implementations, the primary key of one table is derived from the associated linking key of another table. Particular implementations of deriving the primary key from the linking key is provided in detail below in relation to the following Figures.

Based on the received search terms 216, the redacted records data server 206*a* is operable to transmit a set of redacted records and associated linking keys 218 to the records request server 204*a*. The records request server 204*a* is operable to transmit the received redacted records 220 of the received redacted records and associated linking keys 218 to the user device 202*a*. In some implementations, the records request server 204*a* also transmits the associated linking keys to the user device 202*a*. The records request server 204*a*, in this arrangement, stores the associated linking keys in a storage device accessible to the records request server 204*a*.

In some implementations, the redacted records data server 206*a* implements a keyword-based search engine, a semantic search engine (e.g., vector database), a relational database with structured fields, a NoSQL key-value based database with searchable full-text fields, or other data storage architectures that allows for an extraction of relevant data records based on the search terms 216.

In some implementations, the redacted records 220 are displayed on a user interface of the user device 202*a* to be reviewed by a user. For example, the redacted records 220 can include a set of resumes associated with individuals with PII redacted from the set of resumes. As another example, the redacted records 220 can include sensitive strategic plans with key named entities redacted from the plans. As another example, the redacted records 220 can include financial documents with PII and account numbers redacted from the documents. As another example, the redacted records 220 can include healthcare documents with PII and personal health information (PHI) redacted from the healthcare documents. In some cases, a user with access to the user device 202*a* reviews the redacted records 220 and determines a subset of the redacted records 220 that the user wishes to combine with associated sensitive information. In some cases, the user is not authorized to view redacted portions of the redacted records 220 without explicit authorization from an authorizing entity associated with the redacted records 220, as described in relation to FIGS. 2B-C.

FIG. 2B illustrates an environment 200*b* that graphically represents circumstances of a second portion of the first data flow described as a continuation of the circumstances described in relation to FIG. 2A. The second portion of the first data flow includes a records request server 204*b*, which operates similarly to the records request server 204*a* of FIG. 2A, receiving a set of selected records 222 from a user device 202*b*, operating similarly to the user device 202*a*.

In some implementations, the records request server 204*b* is operable to combine the set of selected records 222 with a set of associated sensitive records (e.g., PII). In the context of the present disclosure, the set of selected records 222 and the set of associated sensitive records had been disassociated before being stored in independent databases (e.g., splintered). The selected records 222 represent a subset of the redacted records 220, as described in relation to FIG. 2A.

In some implementations, the records request server 204*b* accesses a set of selected linking keys, each associated with a record of the set of selected records 222. In some cases, the records request server 204*b* accesses the associated linking keys from a local storage device. In some other cases, the records request server 204*b* access the associated linking keys from a remote storage device. In some other implementations, the received selected records 222 are accompanied by the associated linking keys (e.g., the associated linking keys are transmitted with the redacted records 220 and the selected records 222).

The records request server 204*b* is operable to transmit the selected linking keys 224 associated with each record of the set of selected records 222 to a key converter 210*b*. The key converter 210*b* is operable to convert each linking key to a primary key of a set of primary keys 226. Each primary key is associated with a data record represented in a database of a sensitive records data server 208*b*. The key converter 210*b* implements key conversion operations that may include encryption algorithms, e.g., one-way hash, as described in more detail in relation to FIG. 5.

The records request server 204*b* transmits the received primary keys 226 to the sensitive records data server 208*b* to retrieve a sensitive data subset 230 related to each record of the set of selected records 222. In other words, each record of the selected records 222 is associated with a sensitive data record stored in the sensitive records data server 208*b*. The records request server 204*b* is operable to receive the sensitive data subset 230 from the sensitive records data server 208*b*. In some implementations, the sensitive data subset 230 does not include all of the sensitive data associated with the set of selected records 222. For example, the sensitive data subset 230 can only include enough sensitive information to obtain approval from one or more authorizing entities for an unauthorized user associated with the user device 202*b* to access the set of selected records 222 combined with associated sensitive data retrieved from the sensitive records data server 208*b*. For example, the sensitive data subset 230 can include email addresses and/or phone numbers of associated authorizing entities (e.g., an individual associated with a resume represented by a record of the set of selected records 222), but not an address, account number, healthcare information, etc. However, in some cases, the sensitive data subset 230 includes an entirety of sensitive data stored in the sensitive records data server 208*b* associated with a particular record of the selected records 222.

As described below, the records request server 204*b* does not transmit the retrieved sensitive data subset 230 to the user device 202*b* without obtaining authorization from associated authorizing entities. However, by retrieving necessary sensitive information from the sensitive records data server 208*b* to initiate a communication with the authorizing entities, the records request server 204*b* can obtain authorization to combine the selected records 222 with sensitive information stored in the sensitive records data server 208*b* and transmit the combined data to the user device 202*b*.

FIG. 2C illustrates an environment 200*c* that graphically represents circumstances of a third portion of the first data flow described as a continuation of the circumstances described in relation to FIGS. 2A-B. FIG. 2C describes circumstances in which a records request server 204*c*, which operates similarly to the records request servers 204*a-b* of FIGS. 2A-B, transmits authorization messages to authorizing entities 212*c*. An alternative embodiment is described in relation to FIG. 2E, in which a key converter server transmits authorization messages to the authorizing entities. The first data flow, as described in relation to FIGS. 2A, B, C, D is merely an example configuration for illustrative purposes.

The environment 200*c* includes the records requester server 204*c* that is configured to transmit a set of authorization requests 232 to the authorizing entities 212*c* and receive one or more associated authorization responses 234 from the authorizing entities 212*c*. In some implementations, the authorizing requests 232 include a message transmitted over one or more communication channels that include email, text message, telephone, among others. In some implementations, each communication is transmitted between a computational device of the records request server 204*c* and a computational device of a respective authorizing entity of the authorizing entities 212*c*.

In some implementations, the message is an email to an authorizing entity. In some implementations, the email includes a link, a code, or some other mechanism for the authorizing entity to communicate with the records request server 204*c* to indicate that the authorizing entity either provides access or revokes access to the sensitive data.

In some implementations, the records request server 204*c* stores authorization data received via the authorization responses 234 in a database or in a data file stored on a server accessible to the records request server 204*c*. In some implementations, the authorization data is stored as an encrypted record (e.g., via RSA encryption), in which the authorizing entity provides access by decrypting the record.

The authorizing entity can receive a link (e.g., via email, text message, webpage, etc.) from the records request server 204*c*. The link, upon being clicked by the authorizing entity, initiates generation of an authorization code stored on the records request server 204*c*, wherein the code is indicative of authorization for the unauthorized entity to access a data set that includes both the sensitive data and the redacted data. Similarly, the authorizing entity can receive and click a link to revoke authorization. The authorization can be established for a pre-set amount of time (e.g., one hour, one day, etc.), or for an unbounded time period, until it is specifically revoked.

Upon receiving authorization to combine a particular redacted record with an associated sensitive data record from an appropriate authorizing entity, the records request server 204*c* proceeds to request a full set of sensitive data, as described below in relation to FIG. 2D.

FIG. 2D illustrates an environment 200*d* that graphically represents circumstances of a fourth portion of the first data flow described as a continuation of the circumstances described in relation to FIGS. 2A, B, C.

The continuation of the first data flow, as described here, occurs for data records associated with received authorization from respective authorizing entities, as described in relation to FIG. 2C. The first data flow includes a records request server 204*d*, which operates similarly to the records request servers 204*a-c* of FIGS. 2A, B, C, receiving sensitive data 238 from a sensitive records data server 208*d* based on primary keys 236 and combines the sensitive data 238 with an associated set of selected records (e.g., the selected records 222 of FIG. 2B) to be returned to a user device 202*d*. Upon receiving authorization from authorizing entities, as described in relation to the description of FIG. 2C, the records request server 204*d* is authorized to send selected records with sensitive data 240 to the user device 202*d*.

To retrieve the sensitive data from the sensitive records data server 208*a*, the records request server 204*d* transmits the primary keys 236 to the sensitive records data server 208*d*. In contrast to the environment 200*b* described in relation to FIG. 2B, the sensitive records data server 208*b* returns a full set of sensitive data 238 to the records request server 204*d* to be combined with associated selected records. For example, the full set of sensitive data 238 can include a person's name, address, social security number, phone number, etc., to be combined with work experience, skills, employer history, etc. In some implementations, the sensitive data 238 includes a subset of the stored sensitive data as defined by one or more filtering parameters provided to the sensitive records data server 208*d* by the records request server 204*d*.

The records request server 204*d* combines the sensitive data 238 with the associated selected records 222 using one or more techniques of several possible techniques that depend on specifics of how the data is disassociated and how the sensitive data 238 is stored. For example, for a particular data record, the system can redact one or more sensitive data fields. The sensitive data fields can be stored as individual data records or as a composite data record. To combine the sensitive data fields with the redacted version of the particular data record, each sensitive data field can be associated with an index, a hash, an encryption key, etc. The records request server 204*d* is configured to transmit selected records with sensitive data 240 to the user device 202*d*.

FIG. 2E illustrates an environment 200*e* that graphically represents circumstances of an alternative portion of the first data flow, in which a key converter server 210*e* communicates with authorizing entities 212*e*. The environment 200*e* illustrates an alternative embodiment to environment 200*c* as described in relation to FIG. 2C, in which the records request server 204*c* communicates with the authorizing entities 212*c*. The environment 200*e* illustrates an embodiment in which the key converter server 210*e* communicates with the authorizing entities 212*e*.

A records request server 204*e* that operates similar to the records request server 204*c* of FIG. 2C transmits selected linking keys 224*e* to the key converter server 210*e*. The selected linking keys 224*e* are similar to the selected linking keys 224 described in FIG. 2B and are associated with selected records transmitted from a user device (not depicted in FIG. 2E) to the records request server 204*e*.

The key converter server 210*e* executes a key conversion process to convert the selected linking keys 224*e* into a set of primary keys 226*e*. The set of primary keys 226*e* are associated with a data records stored in a database of a sensitive records data server 208*e*, which operates similar to the sensitive records data server 208*d*. Similar to the second portion of the first data flow described in relation to FIG. 2B, the sensitive records data server 208*e* returns a sensitive data subset 228*e*, which includes sensitive information required to initiate a communication channel between the key converter server 210*e* and the authorizing entities 212*e*. In some cases, the sensitive records data server 208*e* stores more sensitive data than what is required to initiate the communication channel.

The key converter server 210*e* transmits one or more authorization requests 230*e* to the authorizing entities 212*e* and receives one or more authorization responses 232*e* from the authorizing entities 212*e*. The transmission and reception of authorization messages is similar to the process described in relation to FIG. 2C. In response to an affirmative authorization response from an authorizing entity, the key converter server 210*e* transmits primary keys 234*e* to the records request server 204*e*. If affirmative authorization is not received from a particular authorizing entity, the associated primary key is not transmitted to the records request server 204*e*, and the records request server 204*e* is not authorized to combine sensitive data from the sensitive records data server 208*e* with redacted data records to provide to an unauthorized user operating a user device.

Figure 3A:
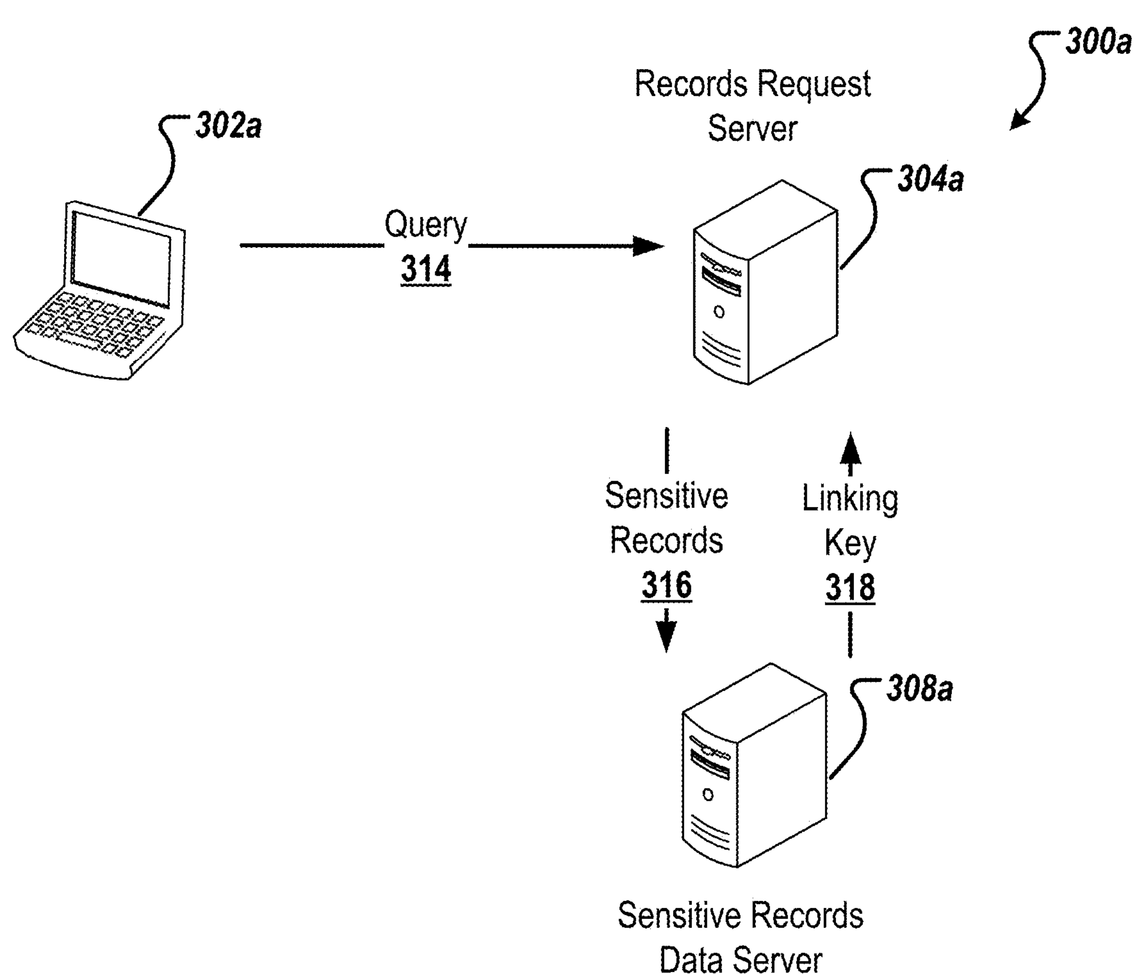
FIG. 3A illustrates an environment that graphically represents circumstances in which a records request server receives a user query from a user.

FIG. 3A illustrates an environment 300*a* that graphically represents circumstances of a first portion of a second data flow protocol. The second data flow protocol includes a series of data flow steps, in which an order of the data flow steps is indicated by increasing numerical identifiers, as illustrated in FIGS. 3A, B, C. The second data flow protocol includes communication between a user device 302*a* and a records request server 304*a*, in which the user device 302*a* ultimately receives data records with sensitive information from the records request server 304*a* based on a query 314. The query 314 includes an identifying data value representative of a type of data stored in a sensitive records data server 308*a*. For example, the identifying data value can include a name, an email address, an account number, an identification number, among other data values.

The second data flow protocol stands in contrast to the first data flow protocol described in relation to FIGS. 2A, B, C, D, in which a user transmits a query, provides a set of selected redacted data records, and upon authorization, receives a set of unredacted data records. The second data flow protocol includes the user device 302*a* that transmits a query in the form of identifying information and receives a matching set of data records.

The records request server 304*a* transmits sensitive data 316 (e.g., data indicative of the query 314) to the sensitive records data server 308*a*. In some implementations, the sensitive data 316 is a derivation of the query 314. In some implementations, the sensitive data 316 is a subset of sensitive data stored in the sensitive records data server 308 associated with a particular data record. For example, the sensitive data 316 can include a person's name, which is a subset of the possible sensitive data related to a person that is stored in the sensitive records data server 308 (e.g., address, email, healthcare information, account numbers, etc.). The sensitive records data server 308*a* retrieves a linking key 318 associated with the received sensitive data 316 and returns the linking key 318 to the records request server 304*a*. The linking key 318 is associated with data records in a redacted records data server, as described in relation to FIG. 3C.

Figure 3B:
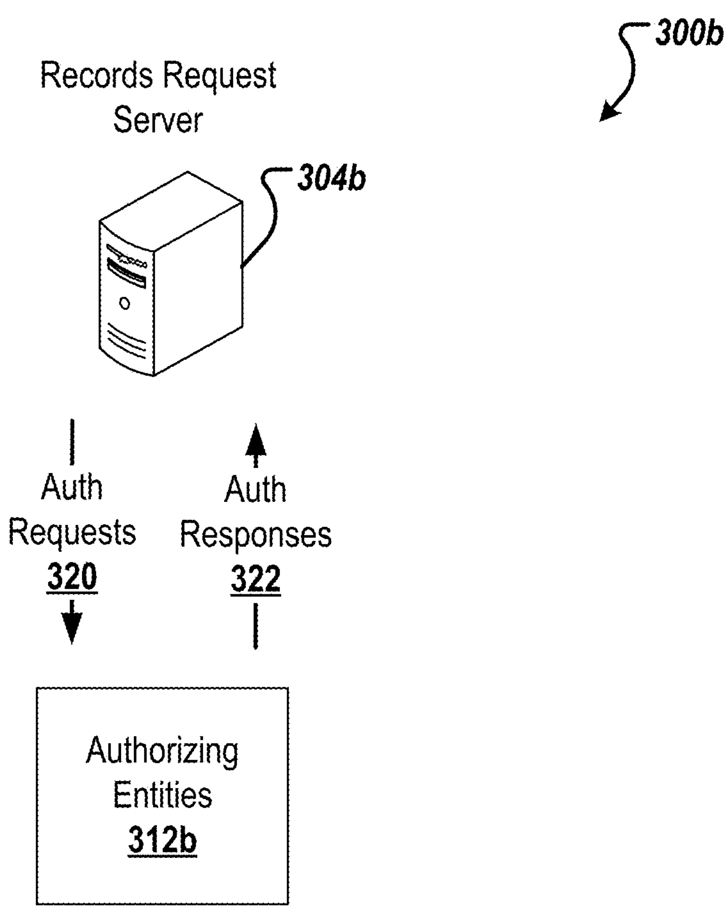
FIG. 3B illustrates an environment that graphically represents circumstances in which a records request server transmits a set of authorization requests to one or more authorizing entities.

FIG. 3B illustrates an environment 300*b* that graphically represents circumstances of a second portion of the second data flow protocol described as a continuation of the circumstances described in relation to FIG. 3A. The second data flow includes a records request server 304*b*, which operates similarly to the records request server 304*a* of FIG. 3A, transmitting a set of authorization requests 320 to one or more authorizing entities 312*c* and receiving one or more associated authorization responses 322 from the one or more authorizing entities 312*b*. In some implementations, the authorizing requests 320 include a message transmitted over one or more communication channels that include email, text message, telephone, among others.

An affirmative authorization received by an authorizing entity is indicative of permission to combine sensitive data stored in the sensitive records data server 308 with redacted records stored in a redacted records data server, as described below in relation to FIG. 3C.

Figure 3C:
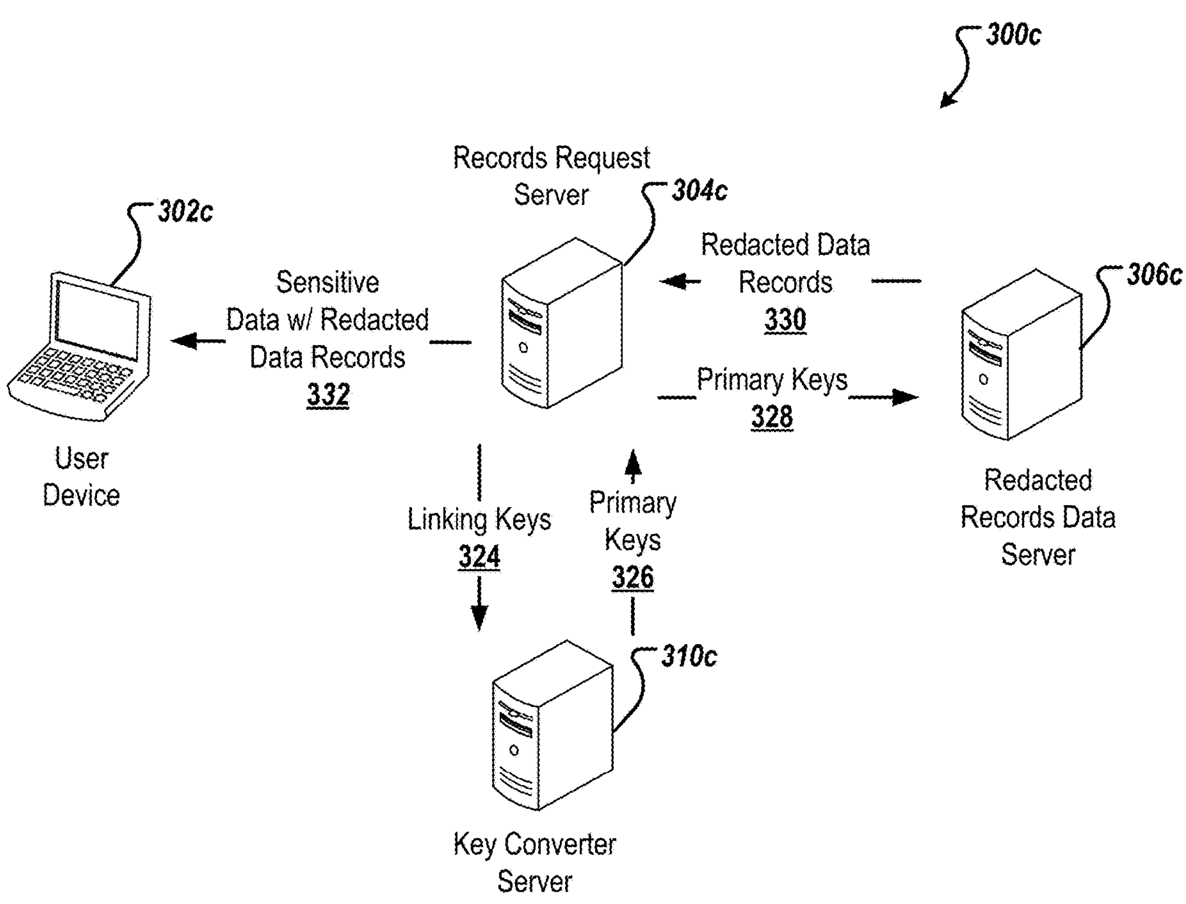
FIG. 3C illustrates an environment that graphically represents circumstances in which a records request server receives a set of redacted data records from a redacted records data server.

FIG. 3C illustrates an environment 300*c* that graphically represents circumstances of a third portion of the second data flow described as a continuation of the circumstances described in relation to FIGS. 3A-B. The continuation of the second data flow, as described here, occurs for data records associated with affirmative authorization from respective authorizing entities, as described in relation to FIG. 3B.

A records request server 304*c*, which operates similarly to the records request server 304*a* of FIG. 3A, transmits linking keys 324 to a key converter 310*c*. The key converter 310 converts the linking keys 324 to primary keys 326, which index entries of a database of a redacted records data server 306*c*. The redacted records data server 306*c* receives the primary keys 328 from the records request server 304*c* and transmits redacted data records 330 associated with the primary keys 328 to the records request server 304*c*.

The records request server 304*c* combines the received redacted data records 330 with the sensitive data, as described in relation to FIG. 3A. The records request server 304*c* transmits sensitive data with redacted data records 332 to the user device 302*c*.

Figure 4:
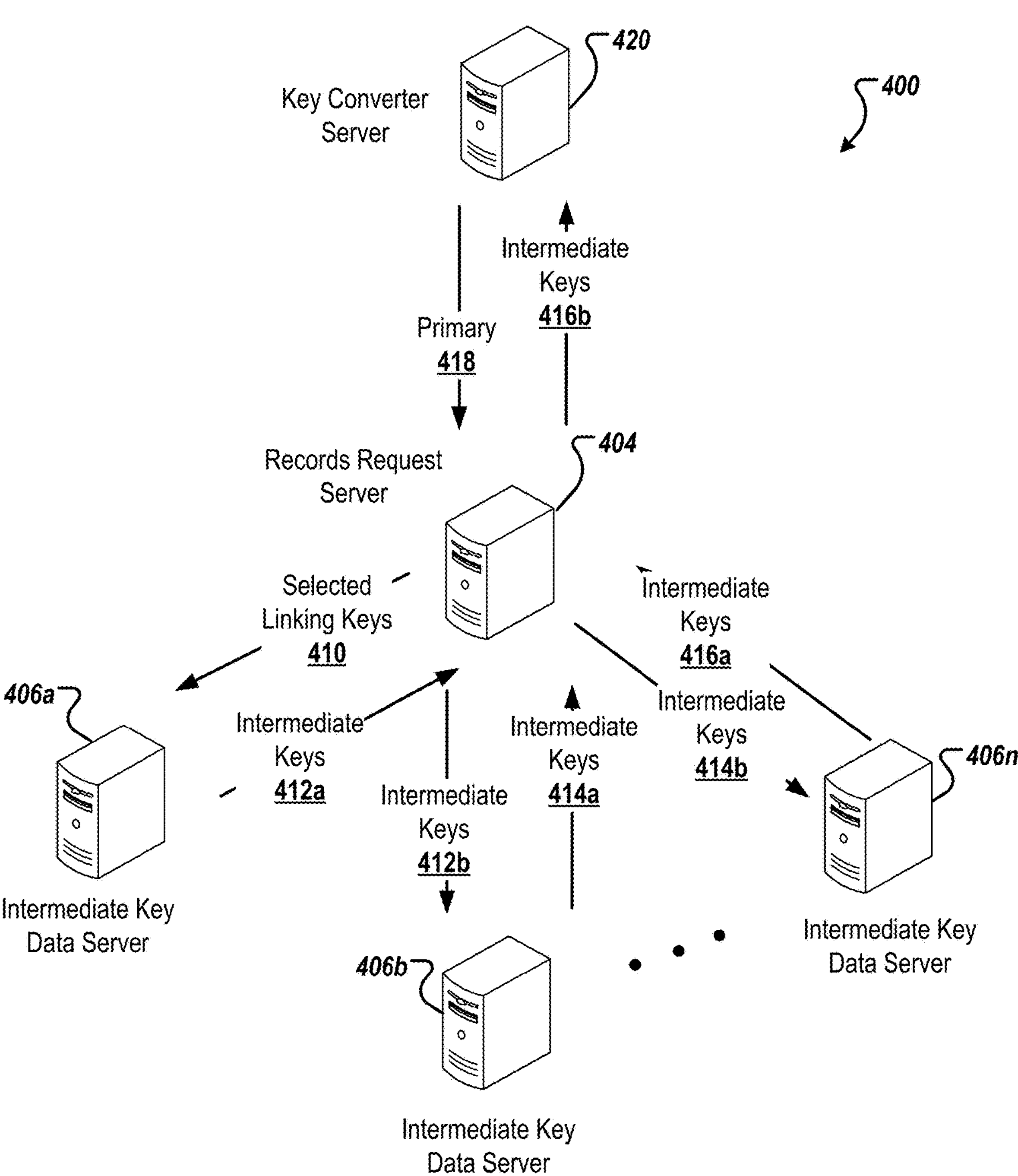
FIG. 4 illustrates an environment that graphically represents an architecture that includes multiple servers storing database keys.

FIG. 4 illustrates an environment 400 that graphically represents circumstances in which a records request server 404 communicates with multiple intermediate key data servers, e.g., intermediate key data server 406*a*, intermediate key data server 406*b*, and intermediate key data server 406*n*. The intermediate key data servers 406*a-n* include databases with data tables that provide a respective mapping between keys. In some implementations, each intermediate key data server is a physically separate device with associated security and access control protocols.

As an example, referring to the first data flow protocol described in relation to FIGS. 2A, B, C, D, the records request server 404 accesses a set of selected linking keys 410. To access a sensitive data record (e.g., sensitive data subset 230) from a sensitive records data server (e.g., the sensitive records data server 208*b*), the records request server 404 must receive a set of primary keys that index the sensitive records data server. To receive the required set of primary keys, the records data server 404 first transmits the received set of selected linking keys 410 that index a redacted records data server (e.g., the redacted records data server 206*a*) to the intermediate key data server 406*a*.

To convert the selected linking keys 410 to a primary key to access the sensitive records data server, the records request server 404 transmits the received selected linking keys 410 to a first intermediate key data server 406*a* and receives intermediate keys 412*a*. In some implementations, the first intermediate key data server 406*a* includes one or more database tables, in which each row of the one or more database tables includes data indicative of a mapping between a key of the selected linking keys 410 and a corresponding key of the intermediate keys 412*a*.

The records request server 404 interacts with one or more additional intermediate key data servers (e.g., intermediate key data servers 406*b-n*) to access a respective data table that stores data indicative of a mapping between a corresponding received intermediate key and another intermediate key. For example, the intermediate key data server 406*b* stores data in one or more data tables that store data indicative of a mapping between intermediate keys 412*b* and intermediate keys 414*a*. As another example, the intermediate key data server 406*n* stores data in on or more data tables that store data indicative of a mapping between intermediate keys 414*b* and intermediate keys 416*a*. After receiving intermediate keys 416*a*, the records request server 404 transmits the intermediate keys 416*b* (which are the same as intermediate keys 416*a*) to a key converter 420, which is operable to convert the intermediate keys 416 to primary keys 418. The primary keys 418 index the sensitive records data server.

As an alternative implementation of the scenario described in relation to FIG. 4, key converter servers can provide a mapping between the intermediate keys, rather than storing the mappings as tables in data servers (e.g., data servers 406*a-n*). The key converter would provide a mapping on the fly via a key conversion algorithm, rather than storing the mappings in a data table.

Figure 5:
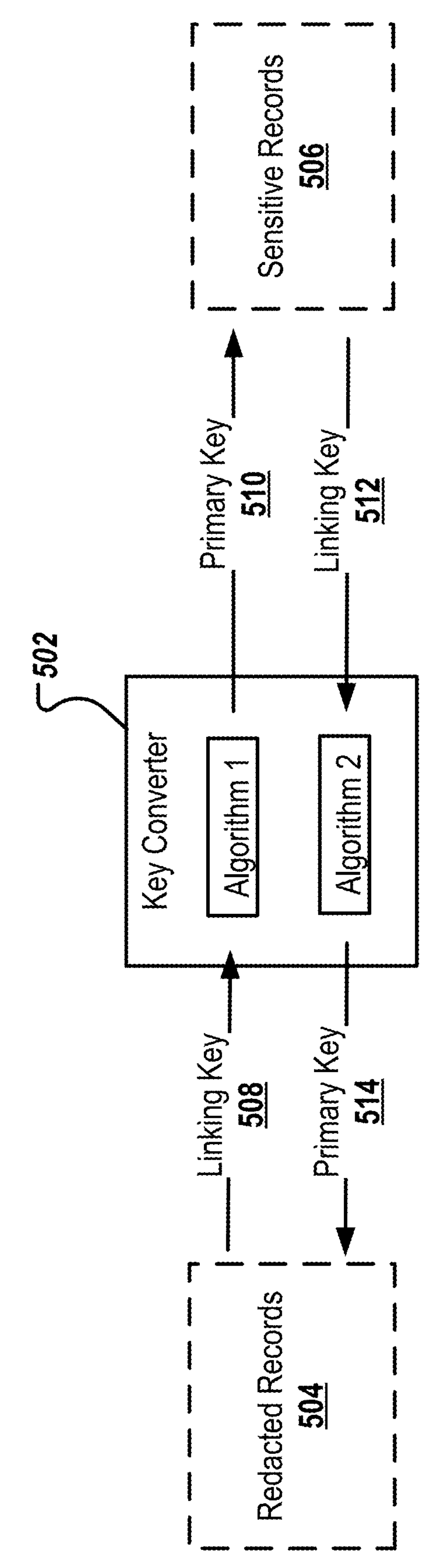
FIG. 5 illustrates an index converter operable to transmit a key associated with a first database to a key associated with a second database.

FIG. 5 illustrates an example system 500 that includes a key converter 502 operable to convert a linking key stored in a first database to a primary key that indexes a second database. The example system 500 includes a redacted records database 504 and a sensitive records database 506. The redacted records database 504 is an example database that can be stored on and accessed by a redacted records data server similar to the redacted records data server 106 of FIG. 1 and the sensitive records database 506 is an example database that can be stored on and accessed by a sensitive records data server similar to the sensitive records data server 108 of FIG. 1.

The key converter 502 is operable to provide a mapping between indexing keys of databases in distinct data storage environments. In traditional databases, e.g., a relational databases, linking keys (commonly referred to as secondary indices) are directly stored in a data table to provide an indicator for accessing related data. The key converter 502 provides a separate algorithmic resource (a key conversion procedure) for converting a linking key stored in a first database to a primary key associated with a second database. If the data stored in the first database is compromised, a bad actor also requires access to the algorithmic resource implemented by the key converter 502 to access associated data of the second database.

The key converter 502 is operable to receive a linking key 508, implement a first algorithm 520 (e.g., a key conversion procedure), in which the first algorithm 520 processes the linking key 508, and outputs a primary key 510. The primary key 510 is a primary key of the sensitive records database 506.

The key converter 502 is also operable to receive a linking key 512, implement a second algorithm 522, in which the second algorithm 522 processes the linking key 512, and outputs a primary key 514. The primary key 514 is a primary key of the redacted records database 504. In other words, the key converter 502 is operable to convert keys associated with the redacted records database 504 and the sensitive records database 506 in both directions.

In some implementations, the linking key 508 is stored in a column of the redacted records database 504. Similarly, the linking key 512 is stored in a column of the sensitive records database 506. For example, the redacted records database 504 includes at least one table with a first column corresponding to the primary key 514 and a second column corresponding to the linking key 508, in which each row of the at least one table includes a data value in the first column and a data value in the second column. Similarly, the sensitive records database 506 includes at least one table with a first column corresponding to the primary key 510 and a second column corresponding to the linking key 512, in which each row of the at least one table includes a data value in the first column and a data value in the second column.

In some implementations, the first algorithm is different from the second algorithm. For example, the key converter 502 can implement a one-way cipher. The one-way cipher is a mathematical function that is easy to compute in one direction and difficult (e.g., computationally infeasible with current computational resources) to reverse. In some implementations, the one-way cipher is a cryptographic process that transforms data into a fixed-size output, making it computationally difficult to reverse. In other words, the computational complexity of generating the fixed-size output is low and the computational complexity of converting the fixed-size output to the original data is high.

Examples of key conversion algorithms include SHA3-256, SHA3-512, and other conversion (e.g., encryption) algorithms certified by the National Institute of Standards and Technology (NIST). Alternative non-certified algorithms can be implemented as well including BLAKE3 cryptographic hash function.

In some other implementations, the first algorithm is the same as the second algorithm. In some implementations, the key converter 502 is operable to change the first and second algorithms according to a schedule or other timing indicators and update linking keys stored in each associated database. In the event that an algorithm is updated (e.g., a new, more secure algorithm is available to the key converter 502), the keys in each database can be updated.

Figure 6:
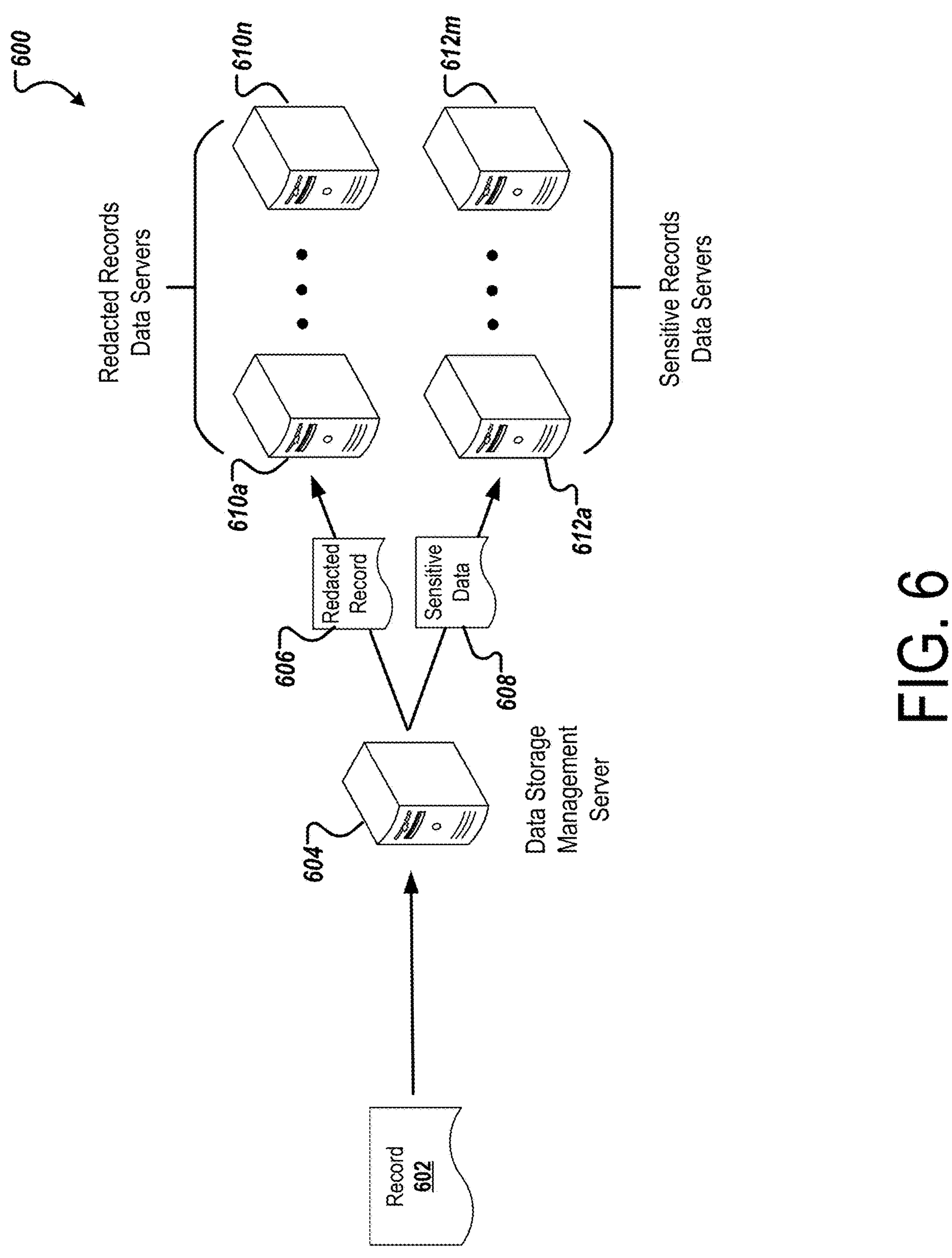
FIG. 6 illustrates an environment that graphically represents an architecture that includes redacted data records stored across multiple redacted records data servers and sensitive data that are stored across multiple sensitive data records data servers.

FIG. 6 illustrates an environment 600 that graphically represents circumstances in which a data record 602 is received by a data storage management server 604. The data storage management server 604 disassociates the data record 602 and splinters the disassociated data across multiple data servers and/or data tables. The disassociated data include a redacted record 606 and a sensitive record 608. A combination of the redacted record 606 and the sensitive record 608 yields the data record 602. The environment 600 depicts a system and technique for populating multiple redacted records data servers and sensitive records data servers.

The environment 600 includes redacted records data servers 610*a-n* and sensitive records data servers 612*a-m*, in which a number of redacted records data servers (N) can be the same or different from a number of sensitive records data servers (M). In some implementations, at least one of the servers of the redacted records data servers 610*a-n* and the sensitive records data servers 612*a-m* store encrypted data.

In addition to storing the redacted record 606 and the sensitive record 608 in associated data servers, the data storage management server 604 also generates and stores keys (e.g., primary keys and linking keys) with each data record, in order to enable the data processing procedures described in the previous figures.

The data storage management server 604 can store a piece of sensitive information in each of the sensitive records data server 612*a-m*. For example, each server can include a table that stores an integer of a social security number. As another example, each server can include a table that stores a component of an address (e.g., street number, street name, zip code, etc.). In some cases, each data server can include multiple tables, each table storing a particular subset of the sensitive information.

Figure 7:
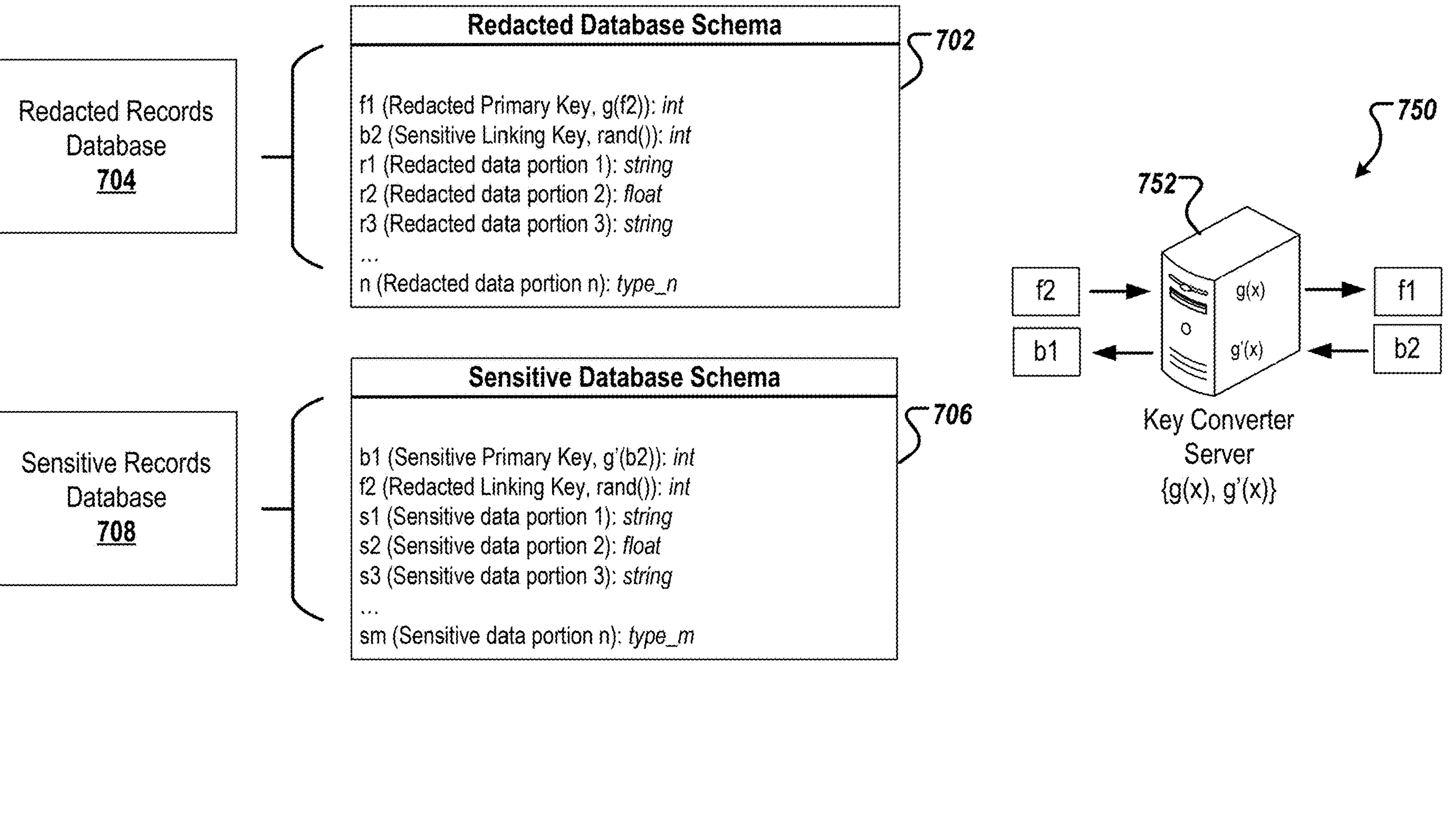
FIG. 7 illustrates example database schema.

FIG. 7 illustrates an example redacted database schema 702 associated with a redacted records database 704 and an example sensitive database schema 706 associated with a sensitive records database 708. In addition, FIG. 7 illustrates an environment 750 that graphically represents circumstances in which a key converter 752 converts (i) a redacted linking key stored in the sensitive records database 708 to a redacted primary key stored in the redacted records database 704 and (ii) and sensitive linking key stored in the redacted records database 704 to a sensitive primary key stored in the sensitive records database 708.

The example redacted database schema 702 represents a database that is indexed by a redacted primary key $f_1$ and a sensitive linking key $b_2$. In some implementations, the sensitive linking key $b_2$ is a randomly generated key (e.g., random integer). In some other implementations, the sensitive linking key $b_2$ is a key of an ordered set of key values. In some implementations, regardless of the method of generating the sensitive linking key $b_2$, the sensitive linking key $b_2$ is not linked to, proportional to, dependent on, or derived from any other data of a system that includes the databases 704, 708 as described in FIG. 7. Similar to the sensitive linking key $b_2$ represented by the example redacted database schema 702, the example sensitive database schema 706 represents a database that is indexed by a sensitive primary key $b_1$ and a redacted linking key $f_2$, in which the properties of $b_1$ and $f_2$ are similar to $f_1$ and $b_2$ respectively (e.g., $f_2$ is generated independent of any other data values stored in a database of the system). The values of $b_2$ and $f_2$ need not be correlated or the same.

The redacted primary key $f_1$ is derived from the redacted linking key $f_2$ by processing $f_2$ with a first key conversion function g(x), such that $g(f_2)=f_1$. The redacted linking key $f_2$ is stored as a key represented in the sensitive database schema 706. Similarly, the example redacted database schema 702 includes a sensitive linking key $b_2$, such that the sensitive primary key $b_1$ is derived from the sensitive linking key $b_2$ by processing $b_2$ with a second key conversion function g'(x), such that $g'(b_2)=b_1$. In summary, both schemas 702, 706 include a generated linking key (e.g., a random key), and a primary key derived from a linking key represented in a schema of the other database, in which one of the two linking keys is used to enable access to data in the first data flow protocol and the other of the two linking keys is used to enable access to data in the second data flow protocol, as described in relation to FIGS. 2A-3C. In some implementations, the first key conversion function is the same as the second key conversion function.

In addition to the primary keys and linking keys represented in respective database schemas, each database 704, 708 includes data values stored in the database. For example, the redacted database schema 702 includes data fields that correspond to fields of redacted data $r_{1-n}$, e.g., non-sensitive data. For example, $r_1$ can represent a particular document or portion of a redacted document. As another example, the sensitive database schema 706 includes data fields that correspond to fields of sensitive data $s_{1-m}$, e.g., sensitive data fields. The sensitive data fields can include names, addresses, account numbers, etc.

The first key conversion function g(x) and the second key conversion function g'(x) are executed by the key converter 752. In some implementations, the key converter 752 is implemented on a key converter server separate from the servers that host the databases represented by the schemas 702, 706. The key converter 752 converts the redacted linking key $f_2$ into the redacted primary key $f_1$ via g(x) and converts the sensitive linking key $b_2$ into the sensitive primary key $b_1$ via g'(x).

To illustrate how accessing the database associated with the example redacted database schema 702 does not provide an unauthorized user access to corresponding data stored in the sensitive records database 708, consider a user with full read access to the redacted records database 704 and the associated schema 702. The user has access to the redacted primary key $f_1$ and the sensitive linking key $b_2$, but not the particular key conversion functions g(x) and g'(x) as these functions are implemented on the fly by the key converter 752. Because neither $f_1$ nor $b_2$ directly point to an index of the sensitive records database 708, an unauthorized user cannot link particular records of the redacted records database 704 with associated records of the sensitive records database 708 without access to functionality of the key converter 752.

FIG. 8 is a flow diagram that illustrates an example process 800 implemented by a system similar to components of the environment 100 described in relation to FIG. 1. The system can include one or more computer systems. For example, the system can include the servers presented in FIG. 1 (e.g., the redacted records data server 106, the sensitive records data server 108, the records request server 104, and the key converter server 110). In some arrangements, functionality may be distributed to more or less computational devices (e.g., servers). For example, operations of a records request server (e.g., the records request server 104) and a key converter server (e.g., the key converter server 110) can be executed by one computing device (e.g., one server) or distributed across multiple computing devices (e.g., three or more servers).

The system receives (802), at records request server, authorization from an authorizing entity to combine a redacted data record with a sensitive data record. The redacted data record includes a non-sensitive subset of a data record, and the sensitive data record includes a sensitive subset of the data record. For example, the data record can be an employee resume, in which the redacted data record includes data fields of the employee resume (e.g., job history, skills, references, etc.) and the sensitive data record includes sensitive information about the employee (e.g., name, address, phone number, etc.). In this example, the authorizing entity can be the employee associated with the employee resume. Authorization can be received via direct permission from the authorizing entity, or by an automated authorization workflow that includes the authorizing entity clicking a link or responding to a message to initiate authorization data to be stored at the records request server.

Receiving authorization can include receiving authorization data from the authorizing entity. In some cases, the authorization data is a particular code, hash, or other data value. The authorization data can be encrypted and stored in a storage device, such that only the authorizing entity can unlock the authorization data to revoke or reinstate the authorization to combine the redacted record with the sensitive record. In some cases, authorization is received for each particular set of redacted and sensitive data records. In some other cases, authorization is received for a set of redacted and sensitive data records. Authorization can be revoked and reinstated by the authorizing entity via a number of authentication protocols.

Upon receiving authorization, the system retrieves (804), at the records request server, the redacted data record from a redacted records data server based on a redacted primary key. The redacted data record includes a sensitive linking key. The records request server subsequently transmits the sensitive linking key to a key converter server. The redacted data record can be stored in a data table of the redacted records data server that includes multiple data rows, in which each data row includes a respective redacted primary key and a respective sensitive linking key.

The system can be configured to perform one or more of the described operations before or after receiving authorization. However, the system receives authorization to combine the sensitive data record with the redacted data record.

The system performs (806), at the key converter server, a key conversion procedure to convert the sensitive linking key to a sensitive primary key. The sensitive primary key is associated with the sensitive data record stored in a sensitive records data server. The key converter server transmits the sensitive primary key to the records request server. In some implementations, operations executed by the key converter server are executed by the records request server, or by a set of computing devices of a shared security environment that includes the records request server.

Each linking key associated with the sensitive records data server and the redacted records data server (the sensitive linking key and the redacted linking key) are generated independent from other data values stored in the respective data servers. For example, the linking keys are not generated based on redacted or sensitive data stored on the servers. In some cases, the linking keys are randomly generated or generated in a way that is uncorrelated with any other data stored in the system. The key converter server is operable to generate associated primary keys from each of the linking keys with an associated key conversion procedure (e.g., a one-way cipher).

The system retrieves (808), at the records request server, the sensitive data record from the sensitive records data server based on the sensitive primary key. In other words, the sensitive data record is stored at the sensitive records data server and is indexed by the sensitive primary key.

The system can store redacted data records across multiple data tables and multiple data servers, and similarly for sensitive data records. For example, the sensitive data record can be split into multiple portions, in which each portion is stored in a separate data table. For example, each digit of a social security number can be stored in an independent data table on an independent data server. To access each portion of the sensitive data record stored in different data tables (e.g., splintered), a distinct linking key is generated for each portion. For example, a linking key for each digit of the social security number is generated in order to identify a storage location of the particular digit. In some cases, the key converter server can convert the sensitive linking key into a sensitive primary key for each portion by including a salt value for each portion (e.g., a unique identifier like a table name or server identifier). In this case, each portion of the sensitive data record is associated with a unique linking key. In some implementations, each portion of the sensitive data record associated with a unique linking key via an associated salt value (e.g., a hub-and-spoke architecture in which multiple "spoke" keys are generated based on a common "hub" key) is generated along with a nested architecture similar to the environment described in relation to FIG. 4. In this case, a relationship between keys is stored in a mapping table or via a key converter system, (e.g., the "spoke" keys of the hub-and-spoke architecture are related to each other and/or to the "hub" key via a mapping in a table or via a key converter system).

The system combines (810), at the records request server, the redacted data record with the sensitive data record to generate a combined data record and transmits (812) the combined data record from the records request server to a user device.

In some implementations, the system receives, at the records request server, a user query from the user device. The user query can define search terms for the system to identify a set of candidate redacted data records associated with the user query from the redacted records data server. For example, the search terms can include a set of employee skills, job functions, etc. The set of candidate redacted data records can include a set of employee resumes that match the search terms. In response to retrieving the set of candidate redacted data records, the records request server transmits the records to the user device. The user device is operable to transmit selected redacted records to the records request server (e.g., a subset of the candidate redacted data records). The selected redacted records are a subset of the candidate redacted records.

The records request server can strip off redacted primary keys and sensitive linking keys from the set of candidate redacted data records before transmitting the records to the user device. For future use, the records request server can store the keys in a storage device. In some cases, the storage devices is local to a server of the described system (e.g., local to the records request server).

FIG. 9 is a flow diagram that illustrates an example process 900 implemented by a system similar to components of the environment 100 described in relation to FIG. 1. The system can include one or more computer systems configured to convert a linking key stored in a first database (or data table) to a primary key stored in a second database (or data table). For example, the system can include the servers presented in FIG. 1 (e.g., the redacted records data server 106, the sensitive records data server 108, the records request server 104, and the key converter server 110). In some arrangements, functionality may be distributed to more or less computational devices (e.g., servers). For example, operations of a records request server (e.g., the records request server 104) and a key converter server (e.g., the key converter server 110) can be executed by one computing device (e.g., one server) or distributed across multiple computing devices (e.g., three or more servers).

The system receives (902), at a key converter server from a records request server, a sensitive linking key stored with a redacted data record represented in a database of a redacted data server. The system can identify the redacted data record through a variety of methods, e.g., by searching the redacted data server based on one or more search terms. By identifying the redacted data record, the system receives a redacted primary key and the sensitive linking key, each stored in the redacted data server as part of the redacted data record.

To identify a corresponding sensitive data record stored in a sensitive records data server (independent from the redacted data record), the system performs (904) a key conversion procedure to convert the sensitive linking key to a sensitive primary key, the sensitive primary key associated with the sensitive data record represented in a database of a sensitive records data server. Similar to the redacted data record, the sensitive data record includes the sensitive primary key and a redacted linking key that points back to the redacted primary key via a different key conversion procedure.

In order to combine the sensitive data record with the redacted data record, the system receives (906) authorization data from an authorizing entity associated with sensitive information of the sensitive data record, the authorization allowing for a combination of the redacted data record with the sensitive data record. In some cases, the authorization data is retrieved by an authorizing entity clicking a link or providing a code and/or encryption key.

Upon receiving authorization, the system transmits (908) the sensitive primary key to the records request server, wherein the records request server is operable to retrieve the redacted data record from the redacted data server and the sensitive data record from the sensitive records data server and to combine the redacted data record with the sensitive data record.

FIG. 10 is a flow diagram that illustrates an example process 1000 implemented by a system similar to components of the environment 100 described in relation to FIG. 1 and environment 600 described in relation to FIG. 6. The system can include one or more computer systems configured to disassociate and splinter a data record. For example, the system can include the servers presented in FIG. 1 (e.g., the redacted records data servers 610*a-n*, the sensitive records data servers 612*a-m*, the records request server 104, the key converter server 110, and the data storage management server 604). In some arrangements, functionality may be distributed to more or less computational devices (e.g., servers). For example, operations of a records request server (e.g., the records request server 104) and a key converter server (e.g., the key converter server 110) can be executed by one computing device (e.g., one server) or distributed across multiple computing devices (e.g., three or more servers).

The system receives (1002) a data record that includes sensitive information. The data record can include multiple data fields of sensitive and non-sensitive information.

The system generates (1004) a redacted data record from the data record. The redacted data record includes the data record without the sensitive information. In other words, the redacted data record includes all non-sensitive information from the data record. Similarly, the system generates (1006) a sensitive data record from the data record, in which the sensitive data record includes the sensitive information from the data record. The process of generating the redacted data record and the sensitive data record is referred to as disassociation, with an objective of storing the sensitive information independently from the non-sensitive information.

The system generates (1008) a sensitive linking key to be stored with the redacted data record in a redacted records data server. The sensitive linking key can be a random number, in some cases. The sensitive linking key provides a mechanism, through a key conversion procedure, to connect the redacted data record with the corresponding sensitive data record stored in a sensitive records data server.

The system generates (1010) a sensitive primary key to be stored with the sensitive data record in the sensitive records data server. The sensitive primary key is generated by processing the sensitive linking key with a first key conversion procedure. In some cases, the first key conversion procedure is a one-way cipher.

The system generates (1012) a redacted linking key to be stored with the sensitive data record in the sensitive records data server. Similar to the sensitive linking key, the redacted linking key provides a mechanism, through a key conversion procedure, to connect the sensitive data record with the corresponding redacted data record stored in a redacted records data server.

The system generates (1014) a redacted primary key to be stored with the redacted data record in the redacted records data server, wherein the redacted primary key is generated by processing the redacted linking key with a second key conversion procedure, e.g., a one-way cipher.

The system stores (1016) the redacted data record, the redacted primary key, and the sensitive linking key in the redacted records data server. The system also stores other redacted data fields included in the redacted data record (e.g., non-sensitive information of the data record). Similarly, the system stores (1018) the sensitive data record, the sensitive primary key, and the redacted linking key in the sensitive records data server, along with other data fields associated with sensitive information of the data record.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A system comprising:

a redacted records data server comprising a processor and a memory for storing a redacted data record, wherein the redacted data record comprises a redacted primary key and a sensitive linking key;

a sensitive records data server for comprising a processor and a memory for storing a sensitive data record, and wherein the sensitive data record comprises a sensitive primary key and a redacted linking key;

a key converter server comprising a processor and a memory operable to (i) convert the redacted linking key to the redacted primary key by implementing a first key conversion procedure and (ii) convert the sensitive linking key to the sensitive primary key by implementing a second key conversion procedure; and a records request server comprising a processor and a memory configured to perform operations comprising:

retrieving the redacted data record from the redacted records data server based on the redacted primary key, receiving the sensitive primary key based on an execution of the second key conversion procedure on the sensitive linking key at the key converter server, retrieving the sensitive data record from the sensitive records data server based on the sensitive primary key received from the key converter server, and combining the redacted data record with the sensitive data record to generate a combined data record, wherein the redacted linking key is generated independent from data values of the redacted data record and the sensitive linking key is generated independent from data values of the sensitive data record, and wherein a respective direct mapping between (i) the redacted primary key and the redacted linking key and (ii) the sensitive primary key and the sensitive linking key are absent from being stored on any of the redacted records data server, the sensitive records data server, the key converter server, or the records request server.

2. The system of claim 1, wherein the sensitive linking key is a random number, and the redacted linking key is a different random number.

3. The system of claim 1, wherein the first key conversion procedure and the second key conversion procedure comprise a respective one-way cipher.

4. The system of claim 1, wherein the records request server is configured to perform operations further comprising:

receiving a user query from a user device, retrieving candidate redacted records associated with the user query from the redacted records data server, and transmitting the candidate redacted records to the user device.

5. The system of claim 4, wherein the records request server transmits the candidate redacted records to the user device without associated redacted primary keys and associated sensitive linking keys, the records request server storing the associated redacted primary keys and associated sensitive linking keys in a storage device.

6. The system of claim 5, wherein the user device is operable to transmit selected redacted records to the records request server, the selected redacted records being a subset of the candidate redacted records, and the selected redacted records comprising the redacted data record.

7. The system of claim 1, wherein the sensitive records data server stores the sensitive data record in a plurality of data tables implemented on a plurality of data servers, each data table storing a portion of the sensitive data record.

8. The system of claim 7, wherein each portion of the sensitive data record is associated with a respective sensitive primary key and a respective sensitive linking key, each sensitive primary key generated by processing the sensitive linking key and a respective salt value with the second key conversion procedure.

9. The system of claim 1, wherein the redacted records data server is operable to implement a redacted database that is characterized by a redacted database schema with data fields comprising the redacted primary key, the sensitive linking key, and at least one redacted data field.

10. The system of claim 1, wherein the sensitive records data server is operable to implement a sensitive database that is characterized by a sensitive database schema with data fields comprising the sensitive primary key, the redacted linking key, and at least one sensitive data field.

11. The system of claim 1, wherein operations executed by the key converter server and operations executed by the records request server are executed on one or more computing devices of a shared security environment.

12. The system of claim 1, wherein the records request server is configured to perform operations further comprising:

retrieving an intermediate linking key from an intermediate data server based on the sensitive linking key, the intermediate data server accessing a data table that stores a mapping between the intermediate linking key and the sensitive linking key; and transmitting the intermediate linking key to the key converter server, the key converter server operable to convert the intermediate linking key to the sensitive primary key.

13. The system of claim 1, wherein the records request server is configured to perform operations further comprising:

retrieving an intermediate linking key from an intermediate key converter server configured to convert the sensitive linking key to the intermediate linking key by executing an intermediate key conversion procedure; and transmitting the intermediate linking key to the key converter server, the key converter server operable to convert the intermediate linking key to the sensitive primary key.

14. A computer implemented method comprising:

retrieving, at a records request server, a redacted data record from a redacted records data server comprising a processor and a memory based on a redacted primary key, wherein the redacted data record includes a sensitive linking key, the sensitive linking key transmitted from the records request server to a key converter server comprising a processor and a memory;

performing, at the key converter server, a key conversion procedure to convert the sensitive linking key to a sensitive primary key, wherein the sensitive primary key is associated with a sensitive data record stored in a sensitive records data server comprising a processor and a memory, the sensitive primary key transmitted from the key converter server to the records request server;

retrieving, at the records request server, the sensitive data record from the sensitive records data server based on the sensitive primary key; and combining, at the records request server, the redacted data record with the sensitive data record to generate a combined data record, wherein the redacted linking key is generated independent from data values of the redacted data record and the sensitive linking key is generated independent from data values of the sensitive data record, and wherein a respective direct mapping between (i) the redacted primary key and the redacted linking key and (ii) the sensitive primary key and the sensitive linking key are absent from being stored on any of the redacted records data server, the sensitive records data server, the key converter server, or the records request server.

15. The computer implemented method of claim 14, wherein the redacted linking key is a random number and the sensitive linking key is a different random number.

16. The computer implemented method of claim 14, wherein the key conversion procedure comprises a one-way cipher.

17. The computer implemented method of claim 16, wherein the sensitive records data server is operable to implement a sensitive database that is characterized by a sensitive database schema with data fields comprising the sensitive primary key, a redacted linking key, and at least one sensitive data field.

18. The computer implemented method of claim 16, wherein operations executed by the key converter server and the operations executed by the records request server are executed on one or more computing devices of a shared security environment.

19. The computer implemented method of claim 16, further comprising:

retrieving, at the records request server, an intermediate linking key from an intermediate data server based on the sensitive linking key, the intermediate data server accessing a data table storing a mapping between the intermediate linking key and the sensitive linking key; and transmitting, from the records request server to the key converter server, the intermediate linking key, the key converter server operable to convert the intermediate linking key to the sensitive primary key.

20. The computer implemented method of claim 16, further comprising:

retrieving, at the records request server, an intermediate linking key from an intermediate key converter server configured to convert the sensitive linking key to the intermediate linking key by executing an intermediate key conversion procedure; and transmitting the intermediate linking key to the key converter server, the key converter server operable to convert the intermediate linking key to the sensitive primary key.

21. The computer implemented method of claim 14, further comprising:

receiving, at the records request server, a user query from a user device;

retrieving, at the records request server, candidate redacted records associated with the user query from the redacted records data server; and transmitting, from the records request server to the user device, the candidate redacted records.

22. The computer implemented method of claim 21, wherein upon retrieving the candidate redacted records from the redacted records data server, the records request server stores associated redacted primary keys and associated sensitive linking keys in a storage device.

23. The computer implemented method of claim 21, wherein a user device is operable to transmit selected redacted records to the records request server, the selected redacted records being a subset of the candidate redacted records, and the selected redacted records comprising the redacted data record.

24. The computer implemented method of claim 14, wherein the sensitive records data server stores the sensitive data record in a plurality of data tables implemented on a plurality of data servers, each data table storing a portion of the sensitive data record.

25. The computer implemented method of claim 24, wherein each portion of the sensitive data record is associated with a respective sensitive primary key and a respective sensitive linking key, each sensitive primary key generated by processing the sensitive linking key and a respective salt value with the key conversion procedure.

26. The computer implemented method of claim 14, wherein the redacted records data server is operable to implement a redacted database that is characterized by a redacted database schema with data fields comprising the redacted primary key, the sensitive linking key, and at least one redacted data field.

27. One or more non-transitory computer readable media storing instructions that, when executed by at least one processor, cause the at least one processor to perform operations comprising:

retrieving, at a records request server, a redacted data record from a redacted records data server comprising a processor and a memory based on a redacted primary key, wherein the redacted data record includes a sensitive linking key, the sensitive linking key transmitted from the records request server to a key converter server comprising a processor and a memory;

performing, at the key converter server, a key conversion procedure to convert the sensitive linking key to a sensitive primary key, wherein the sensitive primary key is associated with a sensitive data record stored in a sensitive records data server comprising a processor and a memory, the sensitive primary key transmitted from the key converter server to the records request server;

retrieving, at the records request server, the sensitive data record from the sensitive records data server based on the sensitive primary key; and combining, at the records request server, the redacted data record with the sensitive data record to generate a combined data record, wherein the redacted linking key is generated independent from data values of the redacted data record and the sensitive linking key is generated independent from data values of the sensitive data record, and wherein a respective direct mapping between (i) the redacted primary key and the redacted linking key and (ii) the sensitive primary key and the sensitive linking key are absent from being stored on any of the redacted records data server, the sensitive records data server, the key converter server, or the records request server.

28. The one or more non-transitory computer readable media of claim 27, the operations further comprising:

receiving, at the records request server, a user query from a user device;

retrieving, at the records request server, candidate redacted records associated with the user query from the redacted records data server; and transmitting, from the records request server to the user device, the candidate redacted records.

* * * * *